(12) United States Patent
Vetter et al.

(10) Patent No.: US 11,303,719 B2
(45) Date of Patent: Apr. 12, 2022

(54) SYSTEM, METHOD AND COMPUTER PROGRAM PRODUCT FOR CAPTURING TOUCH EVENTS FOR A VIRTUAL MOBILE DEVICE PLATFORM

(71) Applicant: HYPORI LLC, Reston, VA (US)

(72) Inventors: Brian J. Vetter, Austin, TX (US); Rajesh P. Gopi, West Lake Hills, TX (US); Galib Arrieta, Austin, TX (US)

(73) Assignee: HYPORI LLC, Reston, VA (US)

( * ) Notice: Subject to any disclaimer, the term of this patent is extended or adjusted under 35 U.S.C. 154(b) by 0 days.

(21) Appl. No.: 17/206,503

(22) Filed: Mar. 19, 2021

(65) Prior Publication Data

US 2021/0227043 A1    Jul. 22, 2021

Related U.S. Application Data

(63) Continuation of application No. 16/577,547, filed on Sep. 20, 2019, now Pat. No. 10,958,756, which is a continuation of application No. 15/449,708, filed on Mar. 3, 2017, now Pat. No. 10,459,772, which is a
(Continued)

(51) Int. Cl.

| | |
|---|---|
| *H04L 29/08* | (2006.01) |
| *G06F 3/041* | (2006.01) |
| *G06F 3/0488* | (2013.01) |
| *G06F 9/52* | (2006.01) |
| *G06F 21/83* | (2013.01) |
| *H04L 12/26* | (2006.01) |
| *H04L 67/59* | (2022.01) |
| *H04L 67/10* | (2022.01) |
| *H04L 69/321* | (2022.01) |

(Continued)

(52) U.S. Cl.
CPC ........ *H04L 67/2861* (2013.01); *G06F 3/0416* (2013.01); *G06F 3/04883* (2013.01); *G06F 9/52* (2013.01); *G06F 21/83* (2013.01); *H04L 67/10* (2013.01); *H04L 69/321* (2013.01); *H04L 43/08* (2013.01)

(58) Field of Classification Search
CPC ...... G06F 3/0416; G06F 3/04883; G06F 9/52; G06F 21/83; H04L 43/08; H04L 67/10; H04L 67/2861; H04L 69/321
See application file for complete search history.

(56) References Cited

U.S. PATENT DOCUMENTS

2008/0225010 A1\* 9/2008 Wang .................... G06F 3/0416
345/173
2013/0031482 A1\* 1/2013 Saul ...................... G06F 3/0488
715/740

\* cited by examiner

*Primary Examiner* — Mihir K Rayan
(74) *Attorney, Agent, or Firm* — Pillsbury Winthrop Shaw Pittman LLP

(57) ABSTRACT

Embodiments disclosed herein can allow a user of mobile device in a network environment to switch between using public network services and using private network services. To access private network services, a virtualization cloud client application running on mobile device connects to a virtualized device hosted in virtualization cloud and brokers access to private network services as well as local device functions. Embodiments disclosed herein provide a system, method, and computer program product for capturing touch events for a virtual mobile device platform and relaying the captured touch events to the virtual mobile device platform while ensuring that movements and speed of touch events are accurately represented at the virtual mobile device platform.

20 Claims, 15 Drawing Sheets

Related U.S. Application Data continuation of application No. 14/160,794, filed on Jan. 22, 2014, now Pat. No. 9,619,673.

(60) Provisional application No. 61/755,205, filed on Jan. 22, 2013.

(51) Int. Cl.
*G06F 3/04883* (2022.01)
*H04L 43/08* (2022.01)

SYSTEM, METHOD AND COMPUTER PROGRAM PRODUCT FOR CAPTURING TOUCH EVENTS FOR A VIRTUAL MOBILE DEVICE PLATFORM

CROSS-REFERENCE TO RELATED APPLICATION(S)

This application is a continuation of U.S. patent application Ser. No. 16/577,547, filed Sep. 20, 2019, which is a continuation of U.S. patent application Ser. No. 15/449,708, filed Mar. 3, 2017, which is a continuation of U.S. patent application Ser. No. 14/160,794, filed Jan. 22, 2014, which claims a benefit of priority from U.S. Provisional Application No. 61/755,205, filed Jan. 22, 2013, entitled "VIRTUAL MOBILE DEVICE PLATFORM."

This application relates to U.S. patent application Ser. No. 14/160,877, filed Jan. 22, 2014, now U.S. Pat. No. 9,380,562, entitled "SYSTEM, METHOD AND COMPUTER PROGRAM PRODUCT FOR PROVIDING NOTIFICATIONS FROM A VIRTUAL DEVICE TO A DISCONNECTED PHYSICAL DEVICE"; Ser. No. 14/160,904, filed Jan. 22, 2014, now U.S. Pat. No. 9,380,523, entitled "SYSTEM, METHOD AND COMPUTER PROGRAM PRODUCT FOR CONNECTING ROAMING MOBILE DEVICES TO A VIRTUAL DEVICE PLATFORM"; Ser. No. 14/160,946, filed Jan. 22, 2014, now U.S. Pat. No. 9,819,593, entitled "SYSTEM, METHOD AND COMPUTER PROGRAM PRODUCT PROVIDING BYPASS MECHANISMS FOR A VIRTUAL MOBILE DEVICE PLATFORM"; Ser. No. 14/161,069, filed Jan. 22, 2014, now U.S. Pat. No. 9,380,456, entitled "SYSTEM, METHOD AND COMPUTER PROGRAM PRODUCT FOR DYNAMICALLY SWITCHING OPERATING SYSTEMS IN A VIRTUAL MOBILE DEVICE PLATFORM"; Ser. No. 14/161,083, filed Jan. 22, 2014, now U.S. Pat. No. 9,697,629, entitled "SYSTEM, METHOD AND COMPUTER PROGRAM PRODUCT FOR USER PERFORMANCE AND DEVICE RESOLUTION SETTINGS"; and Ser. No. 14/161,157, filed Jan. 22, 2014, now U.S. Pat. No. 9,667,703, entitled "SYSTEM, METHOD AND COMPUTER PROGRAM PRODUCT FOR GENERATING REMOTE VIEWS IN A VIRTUAL MOBILE DEVICE PLATFORM." All applications listed in this paragraph are incorporated by reference as if set forth herein in their entireties.

TECHNICAL FIELD

This disclosure relates generally to a virtual mobile device platform for touch-enabled mobile devices. More particularly, embodiments disclosed herein relate to a system, method, and computer program product for capturing touch events for a virtual mobile device platform.

BACKGROUND OF THE RELATED ART

Today's mobile devices such as smart phones and tablets face unique security issues, some of which go hand in hand with mobility. Enterprises, military, and intelligence agencies (collectively referred to herein as "organizations") are all grappling with their users' use of mobile devices as many users are carrying out both business as well as personal activities on their mobile devices. This can be problematic even if a Bring Your Own Device ("BYOD") device policy is in place.

BYOD can raise serious security issues when a user's personal device is used to access both non-sensitive and sensitive (and sometimes risky) networks and/or services. For example, if an employee uses his personal smartphone to access a company network and then loses that phone, untrusted parties could retrieve any unsecured data on the phone. Another type of security breach occurs when an employee leaves a company, she does not have to give the company back her personal device, so company-owned applications, and other data may still be present on her personal device. A challenging but important task for organizations that utilize BYOD is to develop a policy that defines exactly what sensitive company information needs to be protected and which employees should have access to this information, and then to educate all employees on this policy. Commercial carriers are normally relied upon for implementing the security requirements of an organization's BYOD policy.

Because of Internet-based risks, some very risk-averse organizations issue devices specifically for Internet use (this is termed "Inverse-BYOD"), providing unfiltered access to the Internet and reserving filtered, sensitive network data for use within a secured, private network. However, this means that a user likely has to carry multiple devices (including one for his personal use) and organizations do not have a sure way of preventing the user from using his personal mobile device to communicate non-sensitive but company-related information. As such, organizations continue to search for solutions that allow mobile services to be delivered or shared within a single device, rather than having to issue their users multiple devices or separate devices for their personal use and locking them into private networks.

Finding viable solutions to handle mobile devices can be particularly challenging for organizations that operate in high assurance computing environments. A high assurance computing environment is one that provides a certain level of assurance as to its behavior, useful in ensuring a level of secrecy for classified information. For instance, a high assurance operating system may permit only certain certified applications to access a particular portion of a memory on a device where sensitive information is stored. However, this does not prevent the physical device itself to become suspect—how it was built, who has handled it from manufacturing through use, how it is used by the user, etc. Moreover, the device could be physically accessed or otherwise compromised in many ways. For instance, information stored or cached on a mobile device could be accessed while its owner is away (e.g., left on the table at a restaurant or on their desk at work, stolen, or lost) or the user may have downloaded an infected application or could be sent an infected document via email or instant messaging, or accessed an infected service.

Because a mobile device lives in a hostile world, securing the physical device itself (e.g., via Tempest hardware, encrypted storage, biometrics, etc.) is not enough and can be very expensive to do a thorough job. Even so, infiltration from any portion of the stack—from the chips to the software that is installed to the data the device receives—still leaves the device vulnerable to attacks from well-funded, motivated, adversaries. Attempts to provide the level of separation needed within the actual device face many challenges, and at best are likely to become a very expensive niche proposition in the overall commercial mobility ecosystem.

In view of unique challenges in incorporating mobile devices such as smart phones and tablets into secure computing environments, there is room for innovations and improvements.

SUMMARY OF THE DISCLOSURE

Embodiments disclosed herein provide a system, method, and computer program product for capturing touch events for a virtual mobile device platform and relaying the captured touch events to the virtual mobile device platform while ensuring that movements and speed of touch events are accurately represented at the virtual mobile device platform.

In some embodiments, certain touch events are accumulated in a queue and relayed to the virtual mobile device platform with timing information, enabling the virtual mobile device platform to accurately reconstruct the touch events.

Embodiments disclosed herein can provide many advantages. For example, in some embodiments, touch events, including touch movements, touch speed, and gestures are relayed to the virtual mobile device platform in such a way that the properties of the touch events are not changed by network latencies.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions, and/or rearrangements within the spirit and/or scope of the underlying inventive concept will become apparent to those skilled in the art from this disclosure.

As described above, a mobile device lives in a hostile world and, as such, securing the device itself may not be enough and/or possible. There is a desire to separate a physical device from applications that run on the device. Embodiments disclosed herein can remove the applications and services, even much of the device's operating environment from the hostile environment. Instead, these functions are provided on protected hardware and software in a data center where they can be managed, monitored, repaired, and deployed under the care of information technology (IT) experts and administrators.

Figure 1:
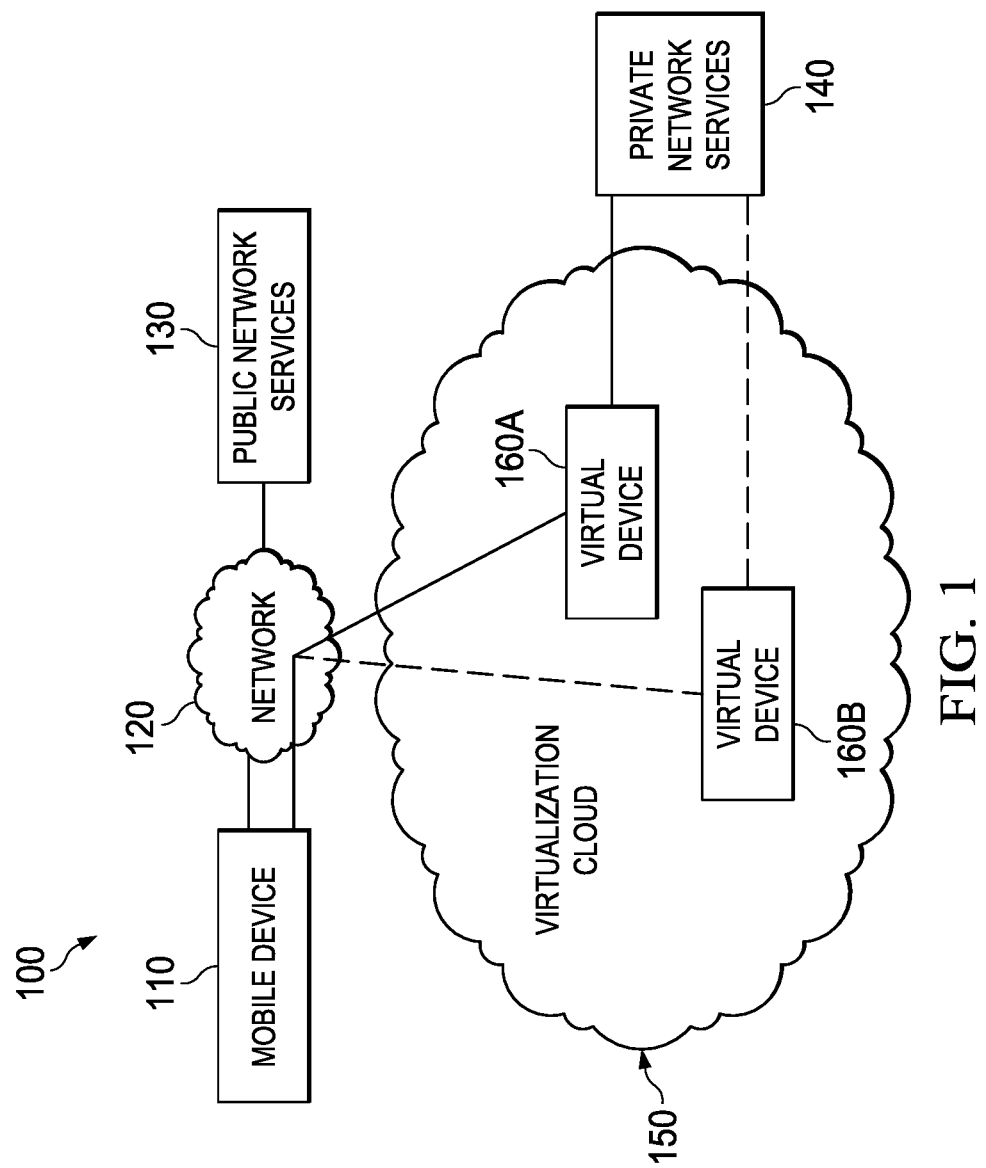
FIG. 1 depicts a diagrammatic representation of an example of an overall network environment in which embodiments disclosed herein may be implemented.

As illustrated in FIG. 1, embodiments disclosed herein can allow a user of mobile device 110 in network environment 100 to switch between using public network services 130 and using private network services 140. In particular, the user may access public network services 130 via public network 120 such as the Internet over which non-sensitive information may be communicated. However, to access private network services 140, a virtualization cloud client application (referred to hereinafter as a "VC client application") running on mobile device 110 connects to a virtualized device (e.g., virtual device 160A) hosted in virtualization cloud 150 and brokers access to private network services 140 as well as local device functions.

Those skilled in the art will appreciate that local device functions may vary depending upon the type of mobile device 110. For example, mobile device 110 can be a touchscreen smartphone with local device functions such as the touch screen, the dialer/phone network, camera, Global Positioning System (GPS), keyboard, speakers, microphone, and so on. Other examples of mobile device 110 may include touchscreen tablets and other touch-enabled mobile devices. As will be explained in further detail below, such mobile device functions can be provided by embodiments disclosed herein on protected hardware and software in virtualization cloud 150 without adversely affecting the user's experience in interacting with mobile device 110, even if the user travels frequently from one continent to another.

In some embodiments, multiple virtualized devices may be created for the same physical device. For example, in FIG. 1, virtual device 160A and virtual device 160B may be created for mobile device 110. This feature is further described below with reference to FIG. 2.

Figure 2:
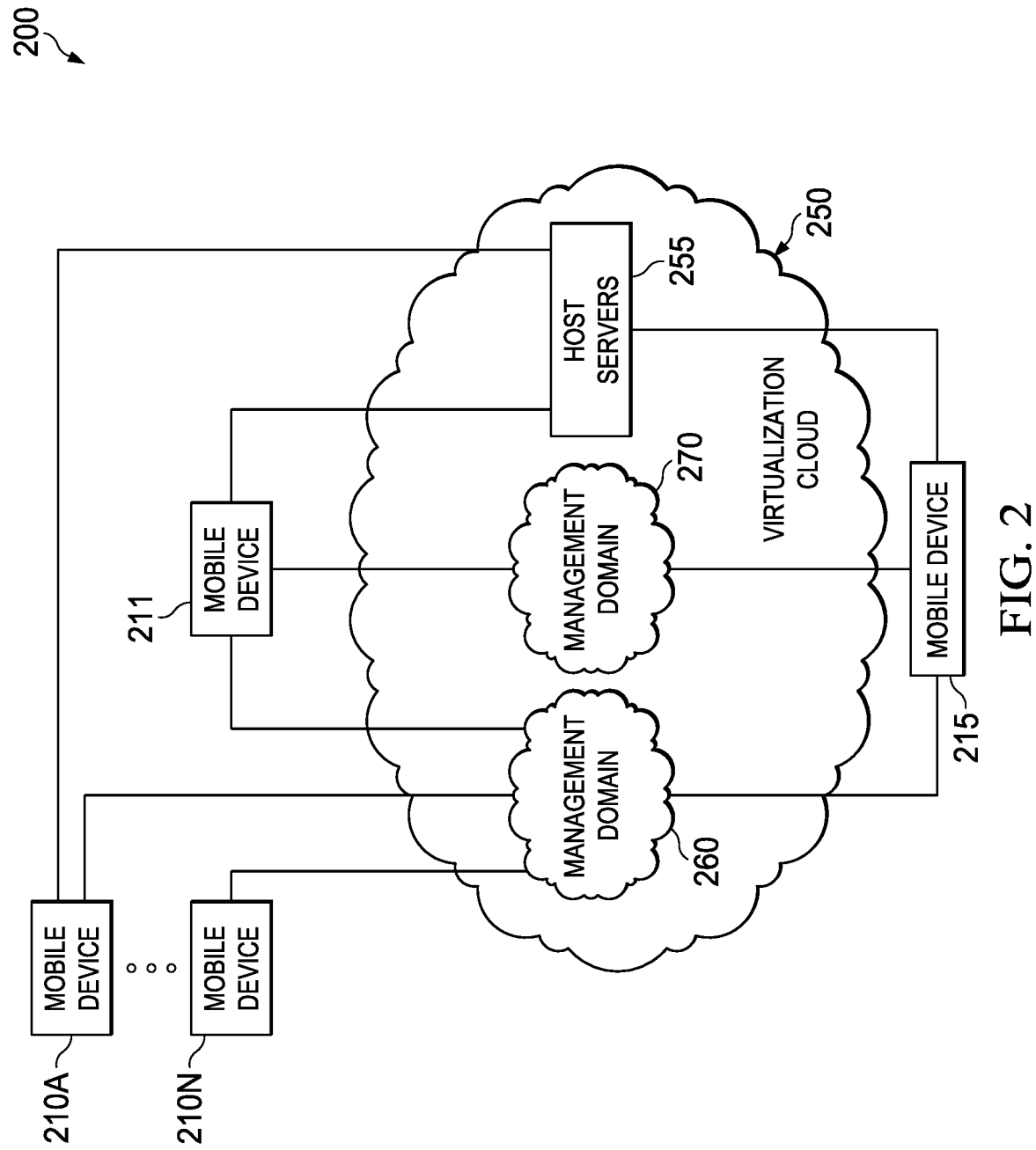
FIG. 2 depicts a diagrammatic representation of an example of a network architecture according to one embodiment.

FIG. 2 depicts a diagrammatic representation of an example of a network architecture according to one embodiment. In this example, system 200 may include virtualization cloud 250 communicatively connected to various types of mobile devices 210A . . . 210N, 211, and 215. Mobile devices 210A . . . 210N, 211, and 215 may represent different types of actual touchscreen devices such as smartphones and tablets. Mobile devices 210A . . . 210N, 211, and 215 may be owned by the same or different entities (e.g., enterprises, users, etc.). Further, mobile devices 210A . . . 210N, 211, and 215 may be programmed with different operating systems such as iOS, Android, and Windows.

Each of mobile devices 210A . . . 210N, 211, and 215 may have a VC client application installed, for instance, by an administrator or IT personnel of system 200. In one embodiment, a VC client application may be downloaded from an online device-specific app store.

In one embodiment, a VC client application may comprise software that brokers access to mobile devices' physical interfaces (e.g., soft and hard keyboards, touchscreen, GPS, camera, accelerometer, speakers, microphone, phone dialer, etc.) and Virtual Private Network (VPN) software that connects across a public network such as the Internet to servers in a virtualization cloud (e.g., virtualization cloud 150 of FIG. 1) over encrypted network interfaces. Virtualization cloud 250 may be an embodiment of virtualization cloud 150 described above with reference to FIG. 1.

Virtualization cloud 250 provides a hosted, networked, application environment. As a non-limiting example, in one embodiment, virtualization cloud 250 is configured as an Android application environment. As illustrated in FIG. 2, virtualization cloud 250 may comprise host servers 255 and management domains 260, 270.

Host servers 255 may host application services. Private network services 140 of FIG. 1 may be an embodiment of application services hosted by host servers 255 of FIG. 2. In one embodiment, a plurality of application services may execute on a collection of servers with extensions to support separation and segmentation of a core server.

Each management domain may comprise a collection of virtualized devices, hosted on one or more server machines. In an Android application environment, such virtualized devices may be referred to as virtual Android devices. From another perspective, a management domain is made up of a collection of server machines providing services to a large number of users. A collection of server machines may host virtual devices for these users and provide access to the applications and services via a remote client interface. In some embodiments, a management domain may further comprise a private application "store" for hosting installable approved enterprise applications particular to that management domain. In some embodiments, a user can have access to one or more "virtual devices" hosted in the management domain, each virtual device containing a core set of applications such as an enterprise address book, mail, calendar, web browser, etc. in addition to any preinstalled enterprise applications.

As FIG. 2 exemplifies, each mobile device (e.g., mobile device 210A, mobile device 211, mobile device 215, etc.) has a connection (via a VC client application installed thereon) to one or more server machines that host their virtual device(s) in a virtualization cloud (e.g., virtualization cloud 250). As explained below, the applications and their data located within a single virtual device are completely inaccessible to the applications and data in another virtual device. The applications are limited to the network services within their management domain and thus cannot access the network services provided in other management domains. For example, mobile device 210A may have a first virtual device hosted on a first server machine in management domain 260 and a second virtual device hosted on a second server machine in management domain 270. However, the applications and their data located within the first virtual device in management domain 260 are completely inaccessible to the applications and data within the second virtual device in management domain 270.

In some embodiments, for each connection to an application service hosted in the virtualization cloud, a different instance of the VC client application is started on the mobile device. For example, a first VC client instance may be started on mobile device 210A to access management domain 260 and a second VC client instance may be started on mobile device 210A to access management domain 270. All of the applications running in a particular management domain for a particular user will be accessed through the corresponding VC client application running on the mobile device. Additionally, the VC client application's remote connection software running in a mobile device does not expose application generated events running natively within the mobile device to the applications running in their virtual device(s), unless they are specific events from the devices brokered by the VC client application. In this way, rather than executing mobile applications in an actual device (e.g., mobile device 210A, etc.), the applications are run remotely in a virtualization cloud (e.g., virtualization cloud 250) under the watchful eyes of an enterprise's systems and network management tools and their administrators, separate from each other and from the consumer/Internet applications and data.

Figure 3:
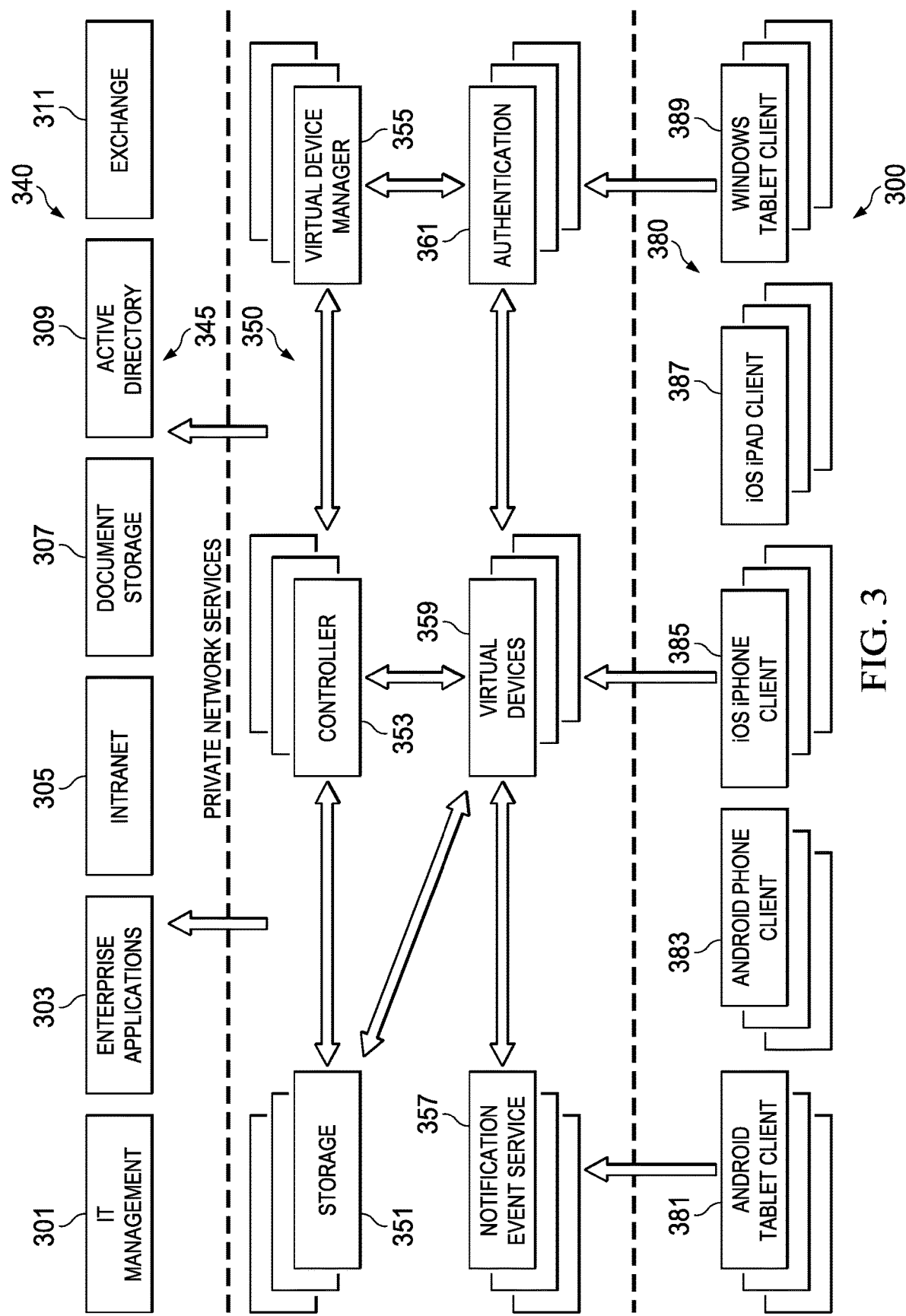
FIG. 3 depicts a diagrammatic representation of an example of a system architecture according to one embodiment.

Turning now to FIG. 3, which depicts a diagrammatic representation of an example of a system architecture according to one embodiment. In this example, system 300 comprises virtualization cloud 350 communicatively connected to private network services 340 and various types of mobile devices 380.

Mobile devices 380 may operate in a distributed computing environment and may operate on various types of operating systems. Similar to mobile devices 110, 210A . . . 210N, 211, 215 described above, each of mobile devices 380 may have a VC client application installed thereon. The installed VC client application may be device-specific. For example, each of Android tablets 381 may have an Android tablet client, each of Android phones 383 may have an Android phone client, each of iOS iPhones 385 may have an iOS iPhone client, each of iOS iPads 387 may have an iOS iPad client, and each of Windows tablets 389 may have a Windows tablet client.

Private network services 340 may comprise enterprise services for private network 345. Non-limiting examples of private network services 340 may include IT management 301, enterprise applications 303, intranet 305, document storage 307, active directory 309, and email exchange 311. These services are known to those skilled in the art and thus are not further described herein.

Virtualization cloud 350 may comprise a plurality of system components, including storage 351, controller 353, virtual device manager 355, notification event service 357, virtual devices 359, and authentication 361. These system components may run on a single server machine or separately on multiple server machines. For the sake of convenience, and not of limitation, FIG. 3 shows each system component running on multiple physical servers.

More specifically, virtual device manager 355 (an application that manages virtual devices) may send a command to controller 353 to create a virtual device. In one embodiment, controller 353 may implement the OpenStack open source cloud computing fabric controller. OpenStack is known to those skilled in the art and thus is not further described herein for the sake of brevity.

In response to the command from virtual device manager 355, controller 353 may first select a golden image, and any applications associated with the golden image. A golden image refers to a virtual machine that was built as a template and that usually contains little, if any, more than the base operating system. A golden image may also be referred to as a gold image, clone image, master image, or base image. To create a golden image, an administrator first sets up the computing environment exactly the way it is needed and then saves the disk image as a pattern for making more copies. The use of golden images can save time and ensure consistency by eliminating the need for repetitive configuration changes and performance tweaks. This approach can be compared to automated replication, which requires a configuration management tool to build new images on demand. In a self-service provisioning environment, a collection of golden images may be referred to as a golden repository, gold catalog, or golden image library.

Using the selected golden image, controller 353 may create virtual device instance 359 and associate with it a storage location in storage server 351. Storage server 351 holds the persisted, physical storage of each virtual device created by controller 353. Controller 353 may then return the information on virtual device instance 359 to virtual device manager 355.

In some embodiments, each user is assigned one or more virtual devices in one or more management domains when they are provisioned. These virtual "devices" contain applications, their settings and device configuration, as well as any data created locally in the device for the user by any installed applications. The images are maintained in network storage servers (e.g., storage servers 351) within the corresponding management domain(s). In some embodiments, as part of this image, the user is provided an emulated "flash" drive for app storage. The images can also be configured to permit access to external enterprise storage. In some embodiments, storage servers may utilize redundant storage to protect data from failures.

In some embodiments, authentication servers 361 may be configured to provide authentication and session management services. For example, when a user (via a VC client application running on a mobile device that the user is using) attempts to access an enterprise application, authentication server 361 may connect to one or more directory servers (e.g., active directory 309) to authenticate the user's access to virtual device(s) where the enterprise application can be run and to provision the user with one or more virtual devices. After the user authenticates, authentication server 361 may direct virtual device manager 355 to locate a device server that will host the user's virtual device 359. In some embodiments, it may ensure that virtual device 359 is "powered on" as well as initiate the initial session negotiation (via establishment of security tokens) between the mobile device running the VC client application and virtual device 359.

Those skilled in the art will appreciate that a virtual "device" is a not really a device—it is a remote execution environment for all of the services and applications that make up a device. There are (at least) two main classes of device servers, "bare metal" device servers and virtual machine device servers. There are some functional, deployment, and cost differences between these types and so ultimately implementation and market demand will determine their allocation and availability.

The bare metal device servers are made up of a large number of relatively small processing units similar in performance and scale to the processing units of actual mobile devices. Each virtual device instance can run on its own physical central processing unit ("CPU") hardware. In some embodiments, a modified version of the Simple Protocol for Independent Computing Environments (SPICE) protocol server software executes directly in the operating system (OS) on each of these instances to provide remote access.

SPICE is an open source protocol and implementation developed by Red Hat that provides remote access to virtual desktops. SPICE has a well-documented protocol that includes the ability to create new "channels" for different remote services. Embodiments extend the SPICE protocol to provide remote access to virtual devices and to broker access to the sensors of the real (physical) devices.

Virtual machine device servers are server class machines that can be found in the server market today. On the virtual machine device servers, each virtual "device" executes in its own virtual machine on a specially configured Linux device server. In some embodiments, a device server may be configured to provide Transport Layer Security (TLS) and VPN encryption, virtual device instrumentation/auditing, integrity checks and anti-virus from virtualization layer, system-side application management, learning of 'normal' behavior, protocol aware firewall, server-side TPM attestation, SELinux-based virtual device separation, VPN service for applications in the virtual devices, and network proxy for traffic monitoring. Some of these features are further explained below.

In some embodiments, virtual devices hosting Android (or Security Enhancements for Android (SEAndroid)) may be created for each user using Linux's Kernel-based Virtual Machine (KVM) and Quick EMUlator (QEMU).

KVM refers to a kernel-resident virtual machine infrastructure built directly into Linux as opposed to other virtualization techniques that run under Linux as a process. This architecture helps KVM operate very efficiently within Linux. KVM provides completely separate virtual environments for Android devices implementing embodiments disclosed herein. KVM itself does not provide any hardware emulation or remoting capabilities.

QEMU is a user-space emulator that works with KVM to provide the hardware emulation. While QEMU can provide processor instruction emulation, embodiments employ it only for emulating hardware for the virtual device. For example, some embodiments use or provide emulated hardware for touch screen/display, memory/storage, audio, cameras, sensors, bypass, and networking.

Linux and KVM provide the isolation between each user and the applications that they run. It is not possible to communicate directly between the application components and services in these separate virtual containers. Thus, each "device", while sharing physical server hardware, runs independently and is separate from the others, as depicted in FIG. 4.

Figure 4:
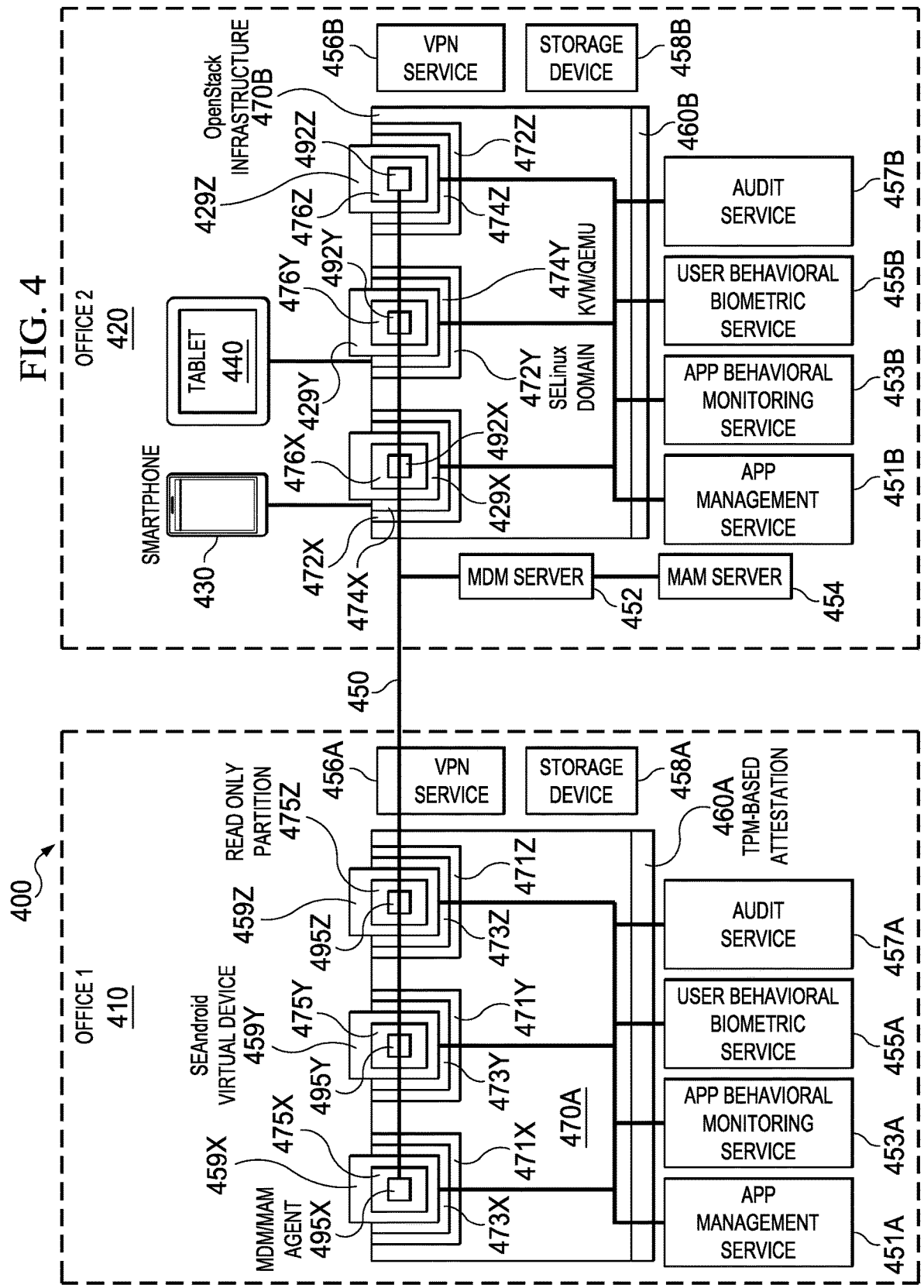
FIG. 4 depicts a diagrammatic representation of an example of virtual device containment and connections according to one embodiment.

FIG. 4 depicts a diagrammatic representation of an example of virtual device containment and connections according to one embodiment. In this example, virtualization cloud 400 may comprise management domain 410 (Office 1) and management domain 420 (Office 2).

Management domain 410 and management domain 420 may be hosted on device servers connected to management network 450 which provides a plurality of network services such as application management services 451A, 451B, application behavioral monitoring services 453A, 453B, user behavioral biometric services 455A, 455B, and audit services 457A, 457B.

Management domain 410 may comprise a plurality of virtual devices 459X, 459Y, 459Z implemented using OpenStack infrastructure 470A on Trusted Platform Module (TPM)-based attestation 460A. Each of the plurality of virtual devices 459X, 459Y, 459Z may include an agent of management network 450 (e.g., agents 495X, 495Y, 495Z, respectively). In some embodiments, the agent may be referred to as a mobile device management and mobile application management (MDM/MAM) agent. In this example, management domain 410 may further comprise VPN service 456A and storage service 458A.

Management domain 420 may comprise a plurality of virtual devices 429X, 429Y, 429Z implemented using OpenStack infrastructure 470B on TPM-based attestation 460B. Each of the plurality of virtual devices 429X, 429Y, 429Z may include an agent of management network 450 (e.g., agents 492X, 492Y, 492Z, respectively). In this example, management domain 420 may further comprise MDM server 452, MAM server 454, VPN service 456B, and storage service 458B.

As illustrated in FIG. 4, each of the plurality of virtual devices 459X, 459Y, 459Z in management domain 410 and each of the plurality of virtual devices 429X, 429Y, 429Z in management domain 420 has a read only partition and its own KVM/QEMU in a particular SELinux domain (e.g., read only partition 475X and KVM/QEMU 473X in SELinux domain 471X, read only partition 475Y and KVM/QEMU 473Y in SELinux domain 471Y, read only partition 475Z and KVM/QEMU 473Z in SELinux domain 471Z, read only partition 476X and KVM/QEMU 474X in SELinux domain 472X, read only partition 476Y and KVM/QEMU 474Y in SELinux domain 472Y, read only partition 476Z and KVM/QEMU 474Z in SELinux domain 472Z).

In the example of FIG. 4, the virtual devices are implemented as SEAndroid virtual devices. SEAndroid may provide benefits such as privileged daemon protection, application isolation, middleware controls, instrumentation and auditing, application install protection, limit application access to sensors, 'untrusted' application sandboxing, read-only core OS partition, centralized patching, and MDM/MAM controls.

In some embodiments, virtual devices can be migrated between device servers by administrative commands (via management network 450), using tools to automate the balancing of load across multiple device servers or based on geographical location.

Each of these virtual devices may be connected to a physical mobile device (e.g., smartphone 430, tablet 440, etc.). In some embodiments, a VC client application running on the physical device may be configured to provide remote two factor authentication, remote signing and decryption, TLS encryption for data in transit, GPS-based access policies, attributes exposed for MDM integration, mechanisms to improve attestation, and/or integration with the mobile device's Mobile Trusted Module (MTM).

When a user is added to a management domain, they are provisioned with a virtual device of a particular type. Similarly, when a user is removed, their virtual devices must be deactivated and their "parts" archived or reclaimed. A separate management server is used by administrators to manage the lifecycle of devices and users of a virtualization cloud (e.g., virtualization cloud 150, virtualization cloud 250, virtualization cloud 350, virtualization cloud 400, etc., collectively referred to hereinafter as the "VC system"). In some embodiments, provisioning services permit administrators to define device "types" (templates) and configurations and assign them to users depending upon the role or duty.

In some embodiment, the management of the VC system and the virtual devices can be controlled through a management policy system. Servers, storage, and virtual devices can be associated with hierarchically arranged policy containers. Policies and access to components can be controlled through these containers and their position in the hierarchy. In some embodiment, these policy containers may be referred to as policy domains and can be used to allocate and delegate control to multiple administration management domains.

For example, consider a hosted VC environment. A hosting partner wishes to support multiple enterprise customers in a single installation. At the same time, they would like to delegate much of the management to their customers. They may choose to create a single policy domain that contains shared resources such as common virtual device images, common device storage, and a shared pool of device servers. For each new customer, they create a sub-domain and grant administrative access to the customers' administrators for their respective sub-domain. In addition, they create a policy in the root domain that all resources are accessible to the sub-domains. The customers' administrators can now create assets (new device image templates, users, administrators, groups) within their own sub-domain. They, in turn, can create their own sub-domains and assign assets, users, groups, administrators, etc. to those sub-domains as well as policies to determine how resources can be inherited from the companies' sub-domain.

If one of these customers wants dedicated server resources to run the virtual devices or to maintain their storage, the hosting partner can add device server and storage server resources to their sub-domain(s) and thus only their virtual devices will be running or be saved on those server assets. Similarly, those systems might have different networking characteristics that would let them share a VPN connection to the enterprise as opposed to configuring a VPN within each of the virtual devices.

This organization can also be beneficial to enterprises that need to delegate management functions to different departments within their enterprise yet want to control and maintain the overall infrastructure centrally.

When migrating a user between two templates, the VC system can support intelligent upgrading, including:
Scheduling specific times for upgrades to occur.
Roll back to a previous device template if an error occurs.
Partial, incremental upgrade processes across a user population.

Detection of whether a user is active on a virtual device before enacting the upgrade.

Graceful shut down of a virtual device for which an upgrade is being forced.

As a non-limiting example, in some embodiment, a provisioning and management server for the virtual machine device servers described above can be built on top of a virtual datacenter management platform such as OVirt, OpenStack, or the like. OVirt and OpenStack are known to those skilled in the art and thus are not further described herein. OVirt provides the underlying data services for managing and accessing virtual machines. The VC system provides an abstraction interface that hides much of the complexity of the underlying virtual datacenter management platform when trying to manage multiple management domains within a single system. In some embodiments, SPICE may be integrated into the virtual datacenter management platform, allowing users to connect to virtual machines through SPICE.

In some embodiments, an administrator might want to allow users to access a mobile virtual device without a persist state of the virtual device beyond a given user's session. In this case, the virtual device may be deleted when the session ends. In some embodiments, the virtual device may optionally warn the user that the virtual device is operating on a kiosk mode when the user logs in, and delete the virtual device when the user logs out. Essentially, the kiosk mode provides a 'fresh' virtual device based on a specified template each time a user logs in.

In a variant of the kiosk mode, a virtual device can be set to synchronize certain enterprise data (e.g., recent email) when the user logs into the kiosk mode device, but the virtual device is still deleted when the user logs out. In this way, any new enterprise data is placed back into the enterprise applications that should own each respective data type. This allows the user to move between server node clusters (e.g., moving between countries) without concern about moving or synchronizing virtual device state between the different servers.

The VC system may support additional modes of operation. For instance, a published app mode may enable an organization to offer specific applications in remote 'containers' to large user populations. An example would be a bank using the published app mode to make an online banking application available to its customers, while hosting that online banking application in their own data centers on their own locked down OS image.

In such a published app mode, the end client application icon can be customized to enable white labeling. For example, when the user logs in, the published application is already open and in focus. When the user quits the application, the remote connection closes. In some embodiments, the published app mode can be coupled with the kiosk mode described above such so that the virtual device does not have a persist state.

In some embodiments, an organization may wish to provision a virtual device (whether a full device, kiosk mode, published app, etc.) to a person not employed by that organization, and the user need only download a VC client application or add the account to their existing VC client application on their mobile device(s).

In some embodiments, an organization may wish to provision one or more virtual devices to one or more employees at a partner organization. In this case, the publishing organization can liaise with the consuming organization to add a VC client application and/or set of authentication settings to the consuming organization. One of the advantages of this approach is that the publishing organization can leverage the user provisioning and authentication mechanisms of the consuming organization. For example, access to the VC client application can become a setting in the consuming organization's active directory, and users in the consuming organization must already have authenticated to the consuming organization in order to have access to the publishing organization's applications/virtual devices.

In this scenario, doing two remoting steps would add latency and complexity to the VC system. To avoid this, when the user connects to the publishing organization's virtual device, the VC client application on the user's physical device can connect to the publishing organization's VC servers via a bypass channel in the VC server of the consuming organization.

As described above, SPICE can create new "channels" for different remote services. Different types of data can be communicated between a mobile device running a VC client application and a virtual device running in the VC system via different SPICE channels. These SPICE channels are mapped to virtual input/output channels.

Figure 5:
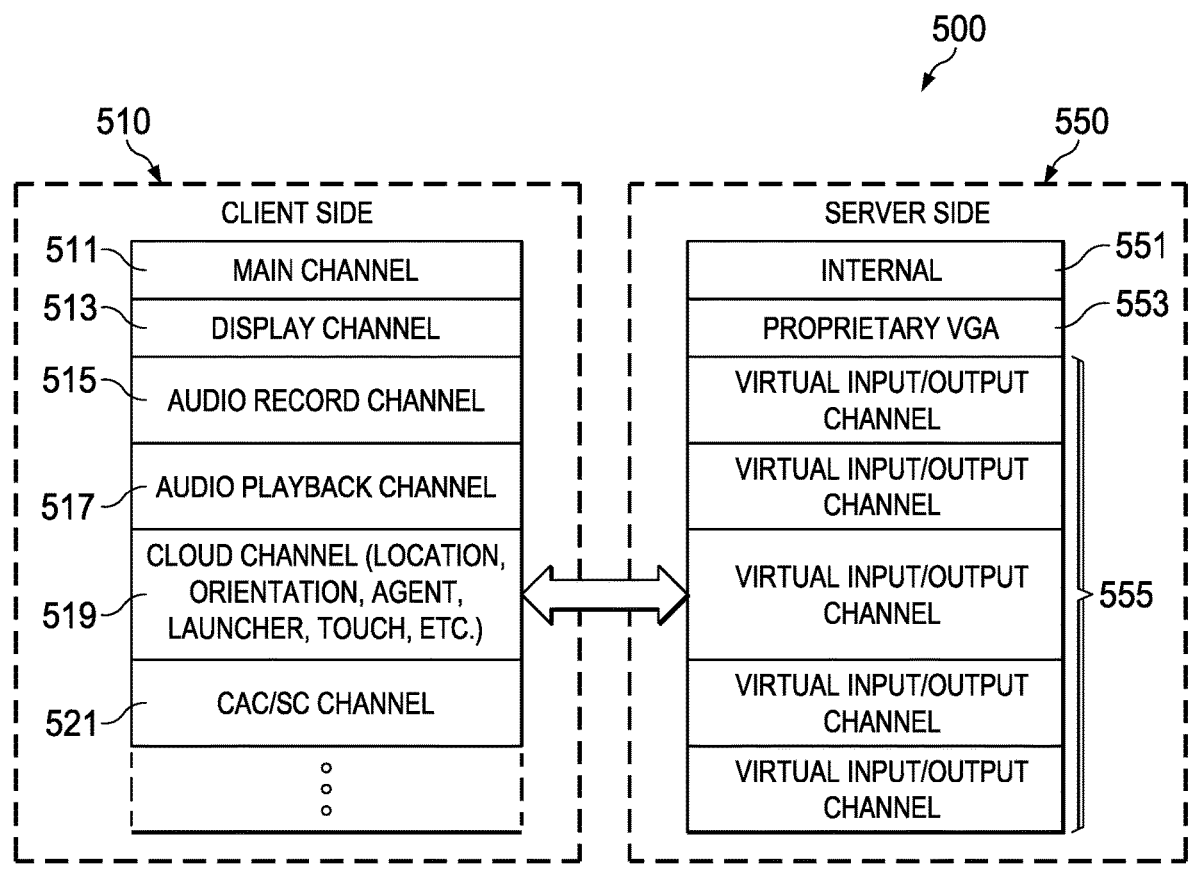
FIG. 5 depicts a diagrammatic representation of an example of a channel based device mapping architecture according to one embodiment.

FIG. 5 depicts a diagrammatic representation of an example of channel based device mapping architecture 500 according to one embodiment. In this example, data (e.g., display data, audio data, location data, etc.) may be communicated from a mobile device (e.g., client side 510) via various SPICE channels (e.g., main channel 511, display channel 513, audio record channel 515, audio playback channel 517, cloud channel 519, Call Admission Control (CAC)/Signaling Controller (SC) channel 521, etc.) to a server in the VC system (e.g., server side 550). Channel based device mapping architecture 500 may include a virtual device mapping module embodied on a non-transitory computer readable medium and configured for mapping the incoming data to appropriate virtual device component (e.g., internal component 551, proprietary video graphic adapter (VGA) 553, etc.) and/or virtual input/output channels 555, each associated with a particular virtual driver. This is further described below with reference to FIG. 6.

Figure 6:
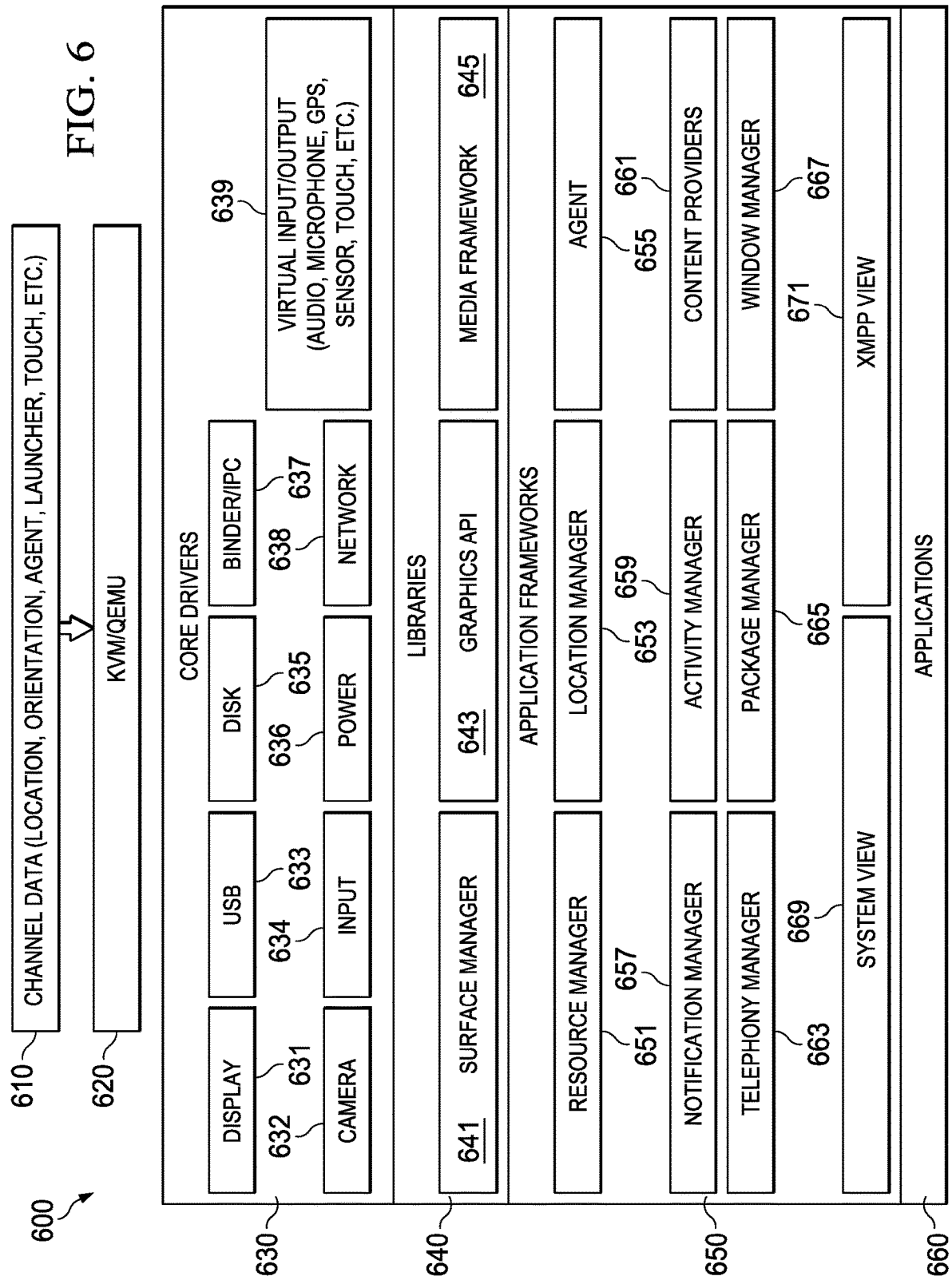
FIG. 6 depicts a diagrammatic representation of an example of virtualization server software architecture according to one embodiment.

FIG. 6 depicts a diagrammatic representation of an example of virtualization server software architecture according to one embodiment. As a non-limiting example, virtualization server software architecture 600 may implement a modified version of Android OS.

As illustrated in FIG. 6, virtualization server software architecture 600 may comprise a plurality of software components. At its core is a Linux kernel with specialized core drivers 630 to abstract the hardware layer from the application runtimes. Channel data 610 are received into a virtual device's KVM/QEMU 620, mapped via virtual input/output channels 639, and handled by corresponding virtual device drivers (e.g., display driver 631, universal serial bus (USB) driver 633, disk driver 635, binder/inter-process communication (IPC) driver 637, camera driver 632, input driver 634, power management 636, and network driver 638, etc.). These "virtual" device drivers replace the drivers for a real device and communicate using QEMU and the SPICE protocol with a VC client application executing on the mobile device for access to the real devices and the services they provide.

Virtualization server software architecture 600 may further comprise a collection of libraries for accessing data, working with text and graphics, encryption and communication, and the underlying OS. In the case of Android OS, each virtual device session includes a full complement of Android's application framework, libraries, runtime, and applications. However, some kernel-based services provided within a virtual device server are modified. For example, power management services are simulated and significantly altered as battery support is not an issue in a virtual device. User interface (UI) indicators for batteries and other elements not applicable to the virtual device can be made to reflect the values of the client device.

As another example, applications running in a virtual device do not use the local device's WiFi or data network. Instead, they use the Internet Protocol (IP)-based network services provided by the virtual device servers. In some embodiments, an "always-on" network interface may be provided to the applications. WiFi and data connectivity management applications the user may install in the virtual device may have no relevance.

Virtualization server software architecture 600 may include additional virtual drivers not shown in FIG. 6. Many of the virtual drivers may communicate with a VC client application running on a mobile device using extensions to the SPICE protocol. Some are designed to improve performance whereas others provide access to features expected in a mobile device. Some example virtual drivers are further described below.

Virtual sensors driver—provides access to the remote client's sensor devices such as the GPS, the gyroscope, the accelerometer, a compass, battery level, WiFi signal strength, and 3G/4G signal strength. Other sensor types can be added as needed.

When an application requests access to a sensor such as the GPS, the sensors driver sends a device message that results in a sensor request being sent to the remote client. The remote client application then makes a similar request to the physical device and begins forwarding sensor data back to the sensor driver as the sensor produces data. When the application no longer needs the sensor information, a close request is sent back to the client where it then stops monitoring the specified sensor.

Some sensors, such as the GPS, can draw significant battery power while running. To prevent unnecessary battery drain, the VC client application running on the physical mobile device can request that the GPS on the local mobile device be turned on or off based on the requirements of applications running on the virtual device in the VC system.

Some sensors such as the accelerometer may change values very frequently. The VC client application can be configured to sample and relay accelerometer values from the local physical device based on attributes and requirements of the app running on the virtual device in the VC system as well as the performance of the network connection between the local and virtual devices (higher network latency and lower available bandwidth result in fewer sensor values being communicated).

A specific example of this is in how the VC system synchronizes the orientation of the remote virtual device to the orientation of the local device by continually monitoring and relaying orientation change events on the accelerometer on the local device, while not relaying every minor rotation of the device all the time even if the application on the remote virtual device is not monitoring the accelerometer data.

Additional sensors that the VC system can remote from the local device to the virtual device may include the network type, network signal strength, battery charge remaining, light sensor (used for screen diming), Bluetooth, peripheral device connectivity and the state of any local payment credential.

Virtual touchscreen driver—supports remoting of multi-touch actions and also gestures. Multi-touch gestures can be used for zooming, rotating and other similar operations. In one embodiment, the SPICE mouse channel may be modified for this purpose. In some embodiments, a designated channel is used for this purpose.

Audio and video bypass driver—improves the performance of audio and video processing for both the VC server and the VC client. While embodiments can work without bypass, there is a CPU cost on both the client and the server when using the internal video processing of the host operating system (e.g., Android). To this end, modified media framework 645 is provided to replace audio and video players that came with the OS with special players that implement the bypass functions. For example, when an application requests to play a video using the Android video player (either full-screen or embedded), the bypass video player captures either the video data or an Universal Resource Locator (URL) that points to an address where the actual video file resides, and passes it via the bypass driver to the remote client. The client then spawns a local video player and plays the video stream. In the case of network video sources, the entire stream can be handled outside of the virtual device via a network proxy.

Audio bypass works much like video bypass. The audio player is replaced to provide proxy access to audio data in the client.

Virtual camera driver—remotes a camera using a combination of a virtual camera device driver and modifications to the camera functions in the media framework. When the camera activity or fragment is loaded in the virtual device, the modified camera viewer and virtual camera driver sends a request to the client to bring up the camera. Once a picture is taken, the picture or video is sent to the virtual device server where it can be placed in the flash storage of the virtual device or can be delivered to an anti-virus scanner and then placed in enterprise storage.

Virtual display driver—optimizes delivery of graphics to a remote client. More specifically, the graphics layer can be instrumented to generate messages via a virtual display driver instead of writing directly to a frame buffer. In some embodiments, surface manager 641 in libraries 640 is implemented to handle partial updates to the Android display. In some embodiments, surface manager 641 may work in conjunction with graphics API 643 to provide acceleration for various commands issued by applications and the Android OS.

These and other virtual drivers support remote access for applications 660 running on application frameworks 650 in the virtual device. Operation of the virtual device, including processes associated with applications 660, as well as user behaviors can be monitored via various components in application frameworks 650 (e.g., resource manager 651, location manger 653, agent 655, notification manager 657, activity manager 659, content providers 661, telephony manager 663, package manager 665, window manager 667, system view 669, Extensible Messaging and Presence Protocol (XMPP) communications service 671, etc.), some of which will be further described below.

One concern when implementing a virtual mobile device platform for touch-enabled mobile devices relates to network latency. When providing remote access to an operating system that relies on touch actions, network latencies can cause strange behaviors in replaying touch actions. Several operating systems designed for touch inputs rely on algorithms to take a collection of touch points over time and convert that into a path or vector for the operating system. Capturing touch events on a mobile device platform and sending the touch events over a communication network to a remote server for accurate or even reasonably accurate reproduction can result in a poor user experience if the events are not time stamped and grouped by the speed of the gesture.

Figure 7:
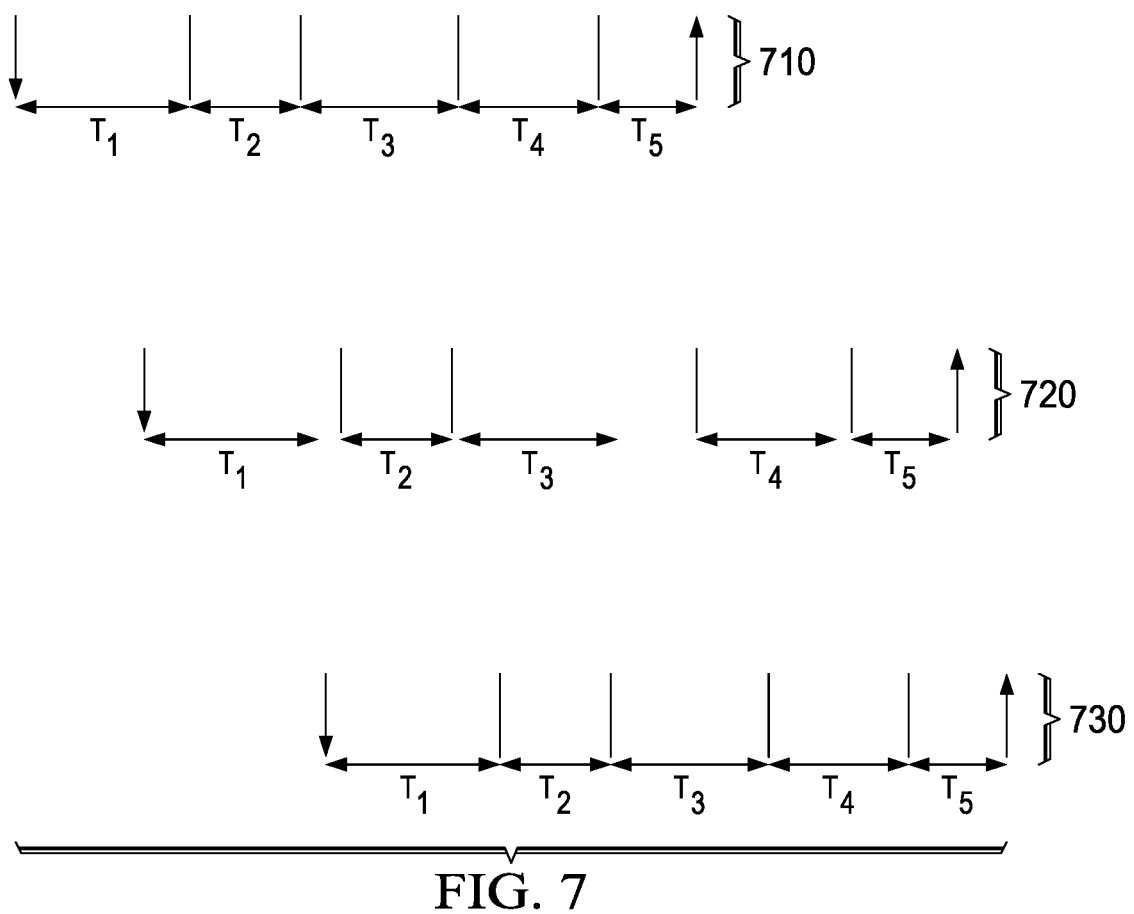
FIG. 7 depicts a diagrammatic representation of an example of a series of touch events over time according to one embodiment.

When touch events are being relayed across a network, varying network latencies can cause the time gaps between these touch events to be changed. This can result in strange user experience behaviors, such as scrolling events bouncing back to where the user started the scroll, causing significant frustration to the end user. FIG. 7 is a diagram depicting a representation of an exemplary series of touch data points over time. A first set 710 of data points represent six touch events sensed by a touch screen on a mobile device. Each data point in set 710 may be comprised of any type of touch event, including, for example, a touch down, a touch up, a touch move, or a cancel.

FIG. 7 also illustrates the elapsed time (T1, T2, T3, T4, T5) between each data point. In the case of a mobile device running applications locally, latency between the touch screen and the processor of the mobile device is negligible. However, when touch events are being relayed across a network, network latencies can cause the time gaps between touch event data points to change. When the time gaps change, the remote virtual mobile device may interpret the touch data differently from the way it was generated by the user. The second set 720 of data points represents the same set 710 of data points, after being transferred over a network. As shown, the gaps between the data points have changed, due to network latencies. As a result, the touch data received by the remote virtual mobile device does not match the touch data generated at the mobile device. Further, if the data points represent a swipe, movement, gesture, etc., it is likely that that swipe, movement, or gesture will not be interpreted properly at the remote virtual device.

The third set 730 of data points shown in FIG. 7 represent a desired reconstruction of set 710 of data points at the remote virtual mobile device. The embodiments described below illustrate examples of techniques for relaying user touch events from a mobile device, over a network, to a remote virtual mobile device, while maintaining the relative timing between the touch event data points, as illustrated by set 730 of data points.

Touch screen inputs can be classified as several touch events. A touch down event occurs when the touch screen is touched by a user. A touch move event occurs as user moves their finger across the screen. A touch up event occurs when a user raises their finger from the screen. A cancel touch event occurs when a user moves their finger past the edge of the screen. A cancel touch event can also occur if the phone is interrupted by another process, such as receiving a call, etc. In addition to the types of touch events, a touch screen can also capture multiple touch pointers. Each finger that touches the touch screen is represented as a touch pointer. For example, if a user touches the screen with three fingers, then the touch event will be reported as having three pointers.

The techniques described below take into account the types of touch events captured, the number of touch pointers, and the timing (and therefore the speed) of the touch events and accurately relays them to a remote virtual mobile device. This enables the client application to capture rapid finger movements as gestures and relay them as paths to the remote virtual device, ensuring that the user's finger 'momentum' is accurately captured and operations such as scrolling or gestures are completed successfully.

Figure 8:
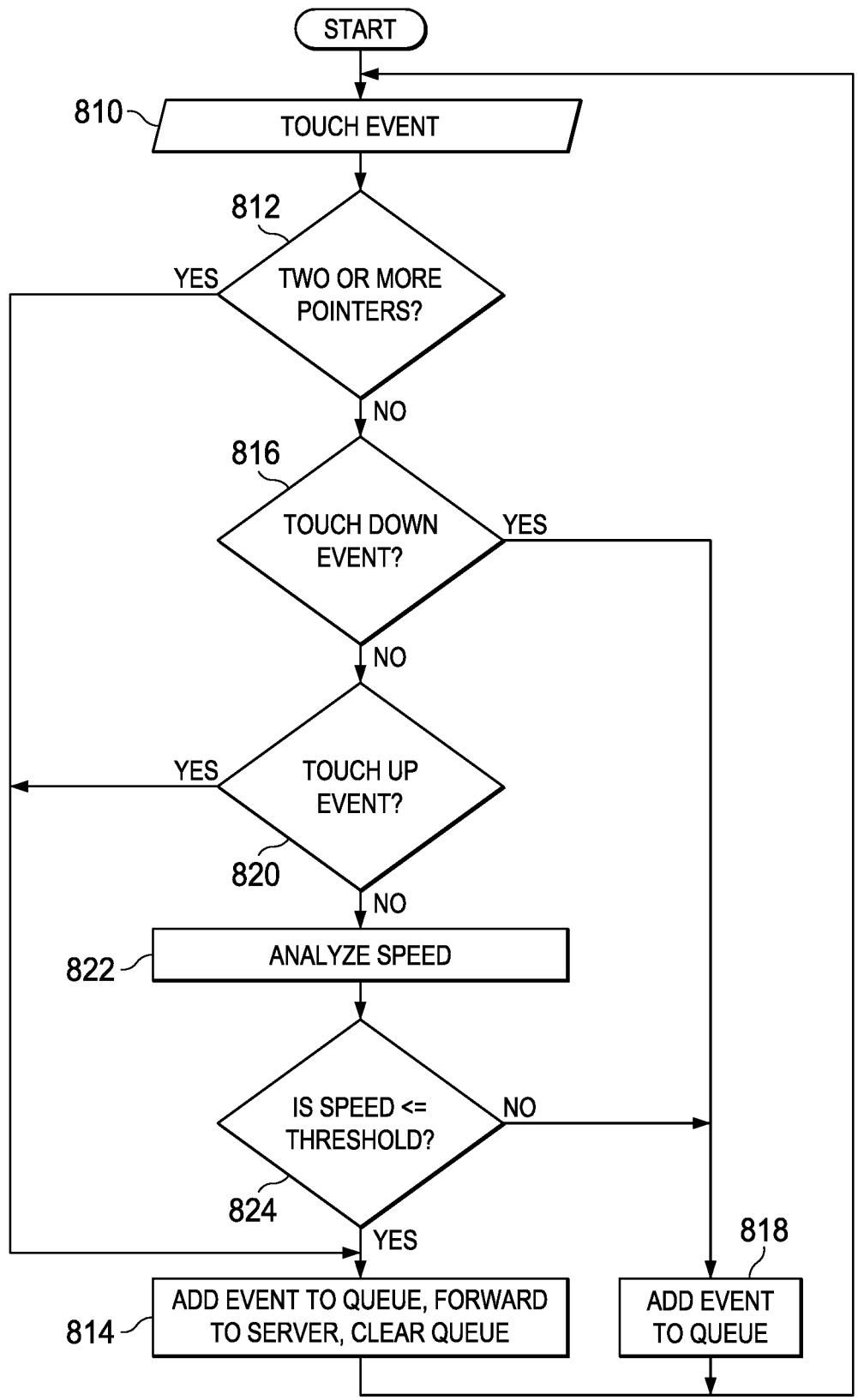
FIG. 8 depicts a flowchart of a process for handling touch events at a client device according to one embodiment.

FIG. 8 depicts a flowchart of a process for handling touch events at a client device according to one embodiment. In this example, the touch events and speed of touch events are analyzed at the client device. In other examples described below, the touch events and speed of touch events are analyzed at the remote server. Generally, the process depicted in FIG. 8, depending on various parameters, either sends touch event data to the server, or accumulations touch event data at the client device for later transmission to the server. At the server, the touch event data is reconstructed to closely match the touch events as captured at the client device.

In the example shown in FIG. 8, touch event data is either accumulated in a queue or sent to a server based on the following rules. If a touch event has two or more touch pointers, the touch event is forwarded to the server immediately. If a touch event is a touch down event, the touch event is accumulated is a queue and not immediately forwarded to the server. If the touch event is a touch move event, the touch event is analyzed for speed with respect with the previous touch event. If the speed is slower than a given speed constant, all the accumulated events in the queue are forwarded to the server immediately. If the speed is greater than the given speed constant, then the touch event is accumulated in the queue and not immediately forwarded to the server. If the touch event is a touch up event, all the accumulated events in the queue are forwarded to the server immediately. Touch event data that is sent from the queue to the server includes the touch event type and the time delta between subsequent touch events.

The process depicted in FIG. 8 begins at block 810, where a touch event is captured by the touch screen of a mobile device. At step 812, the process determines whether two or more touch pointers were captured. If so, the process proceed to step 814 where the touch event is added to the queue. The touch event data accumulated in the queue is then forwarded to the server, and the queue is cleared. The process then waits for the next touch event (step 810). If only one touch pointer is captured, the process determines if the touch event was a touch down event (step 816). If so, the touch event is added to the queue (step 818), and the process waits for the next touch event (step 810). If the touch event was not a touch down, the process determines if the touch event was a touch up event (step 820). If so, the process proceed to step 814 where the touch event is added to the queue. The touch event data accumulated in the queue is then forwarded to the server, and the queue is cleared. The process then waits for the next touch event (step 810).

If the touch event was not a touch up (as determined at step 820), the process assumes that the event is a touch move, and analyzes the speed of the touch move (step 822), relative to the previous touch event. In one example, the speed of the event is determined based on the time of the current touch event, the time of the previous touch event, and the distance between the events on the screen. The speed is calculated by dividing the determined distance by the time between the two events. Once the speed is determined, the process determines whether the calculated speed is less than a threshold speed (step 824). The value of the threshold speed can be a constant chosen based on various factors, as one skilled in the art would understand. If the speed is less than the threshold, the process proceeds to step 814 where the touch event is added to the queue. The touch event data accumulated in the queue is then forwarded to the server, and the queue is cleared. If the speed is greater than the threshold, the process proceeds to step 818 where the touch event is added to the queue.

Figure 9:
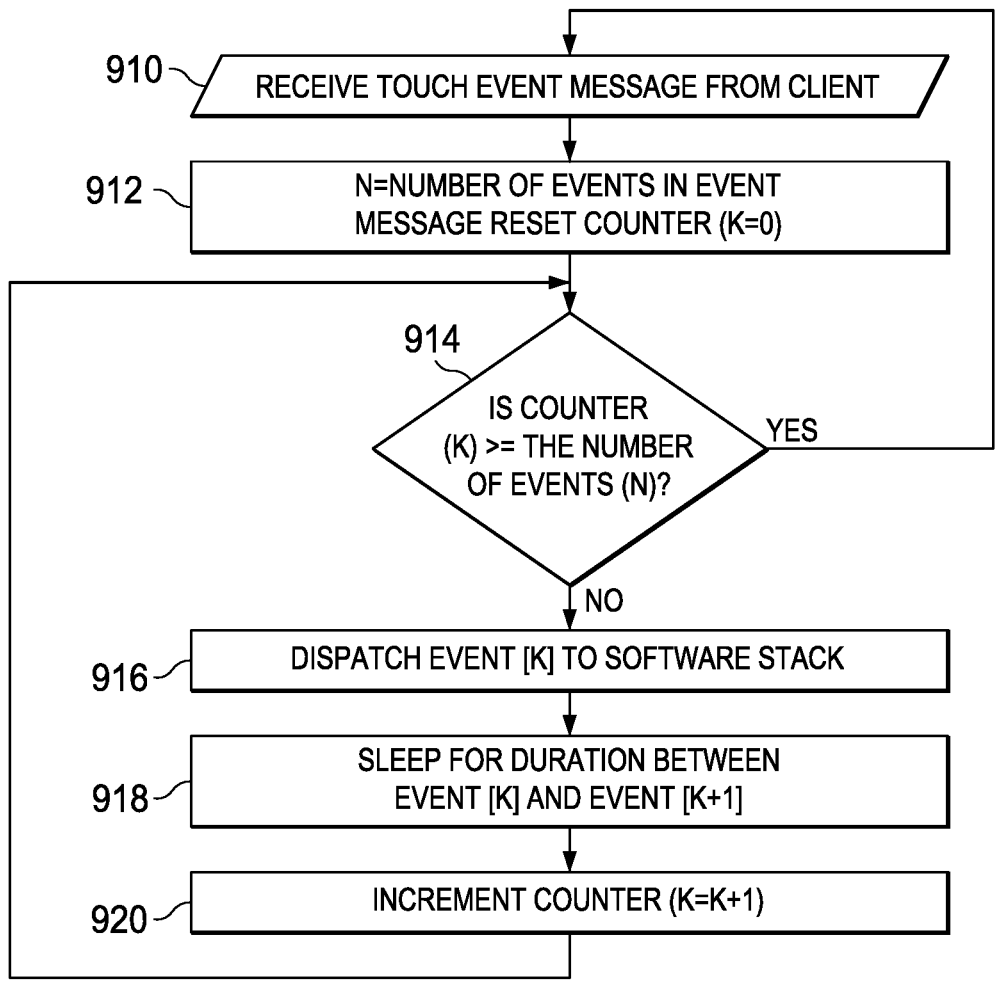
FIG. 9 depicts a flowchart of a process for handling touch events at a server according to one embodiment.

FIG. 9 depicts a flowchart of a process for handling touch events at a server according to one embodiment. At step 910, a touch event message is received from the client. The touch event message includes information relating to all of the events in the queue that were forwarded to the server. The information includes the type of each touch event, as well as timing information. At step 912, variable N is set to equal the number of touch events in the received touch event message. A loop counter K is set to zero.

At step 914, the process determines if the counter K is greater than or equal to the number of touch events in the received touch event message. If not, event[K] is dispatched to the software stack (step 916). For example, on the first pass of the loop (K=1), information about the first touch event in the queue is sent to the software stack. At step 918, the process sleeps for a time equal to the duration between the event[K] and the next event[K+1]. At step 920, the loop counter K is incremented by one, and the process proceeds again to step 914. As the process proceeds through the loop formed by steps 914, 916, 918, and 920, all of the data points in the queue of the captured touch events at the client are reconstructed. Referring back to FIG. 7, by dispatching subsequent events and sleeping between dispatches, the loop accurately reconstructs the data points (like the set 730 of data points), which will closely match the set 710 of data points collected at the client device. At the end of the loop (when counter K is greater than or equal to the number of events in the touch event message), the process proceeds to step 910, and waits for the next touch event message.

Note that the exemplary processes illustrated in FIGS. 8 and 9 (as well as the following examples) are merely examples. In other examples, the illustrated steps can be performed in a different order, or some steps can be performed simultaneously, as desired.

The processes depicted in FIGS. 8 and 9 are adequate for the most common circumstances, except for the case when a user triggers a touch down event without a subsequent touch move or touch up events. In that scenario, the algorithm illustrated in FIG. 8 will hold the touch down event in the queue indefinitely until the user moves their finger a little bit or lifts their finger from the touch sensor. To overcome this limitation, in one embodiment, a secondary thread is created whose purpose is to dispatch accumulated events that have not been sent because the user has not moved their finger or because the user has been moving their finger across the touch sensor too fast, for too long.

Figure 10:
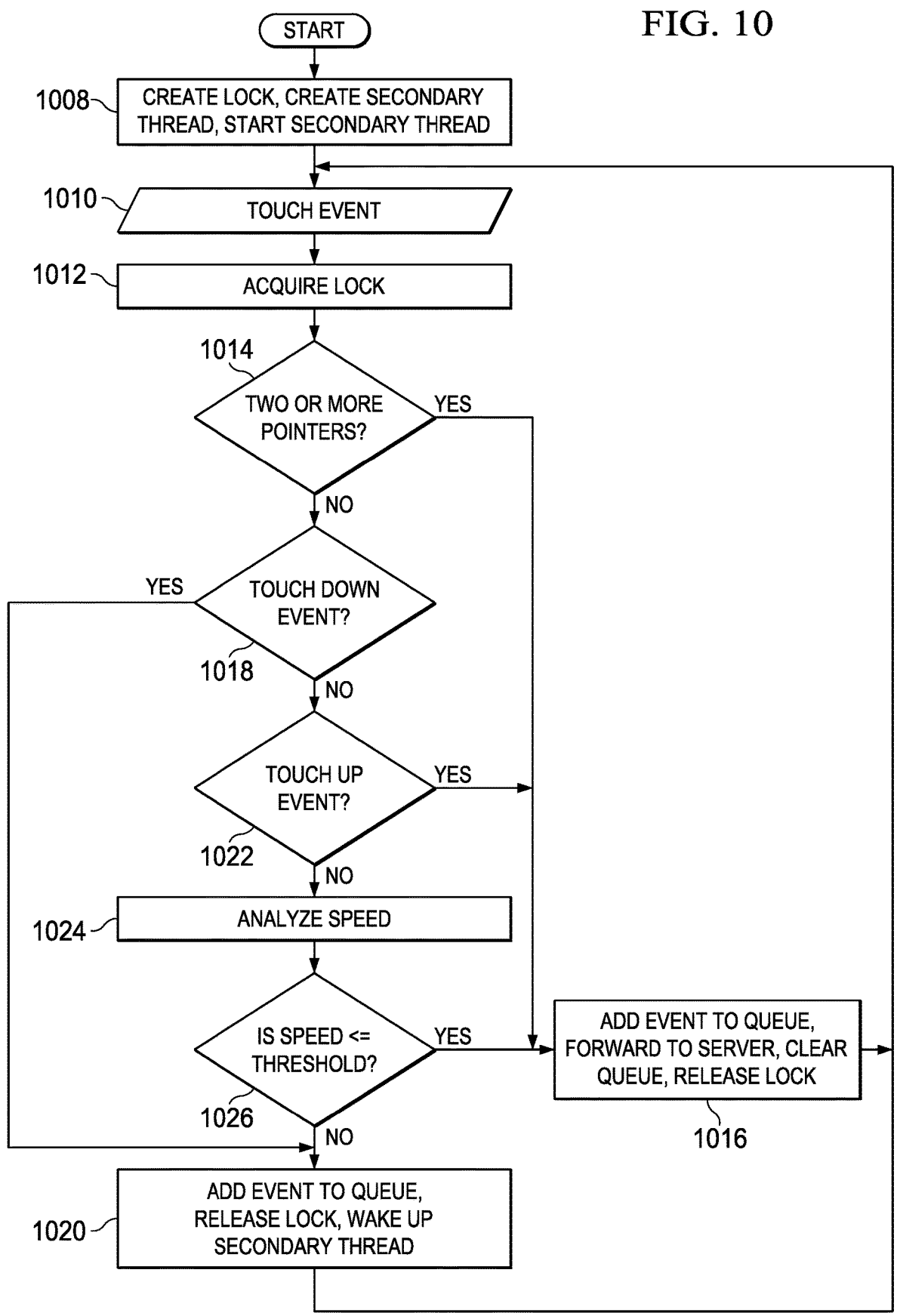
FIG. 10 depicts a flowchart of a process for handling touch events at a client device, including invoking a secondary thread, according to one embodiment.
Figure 11:
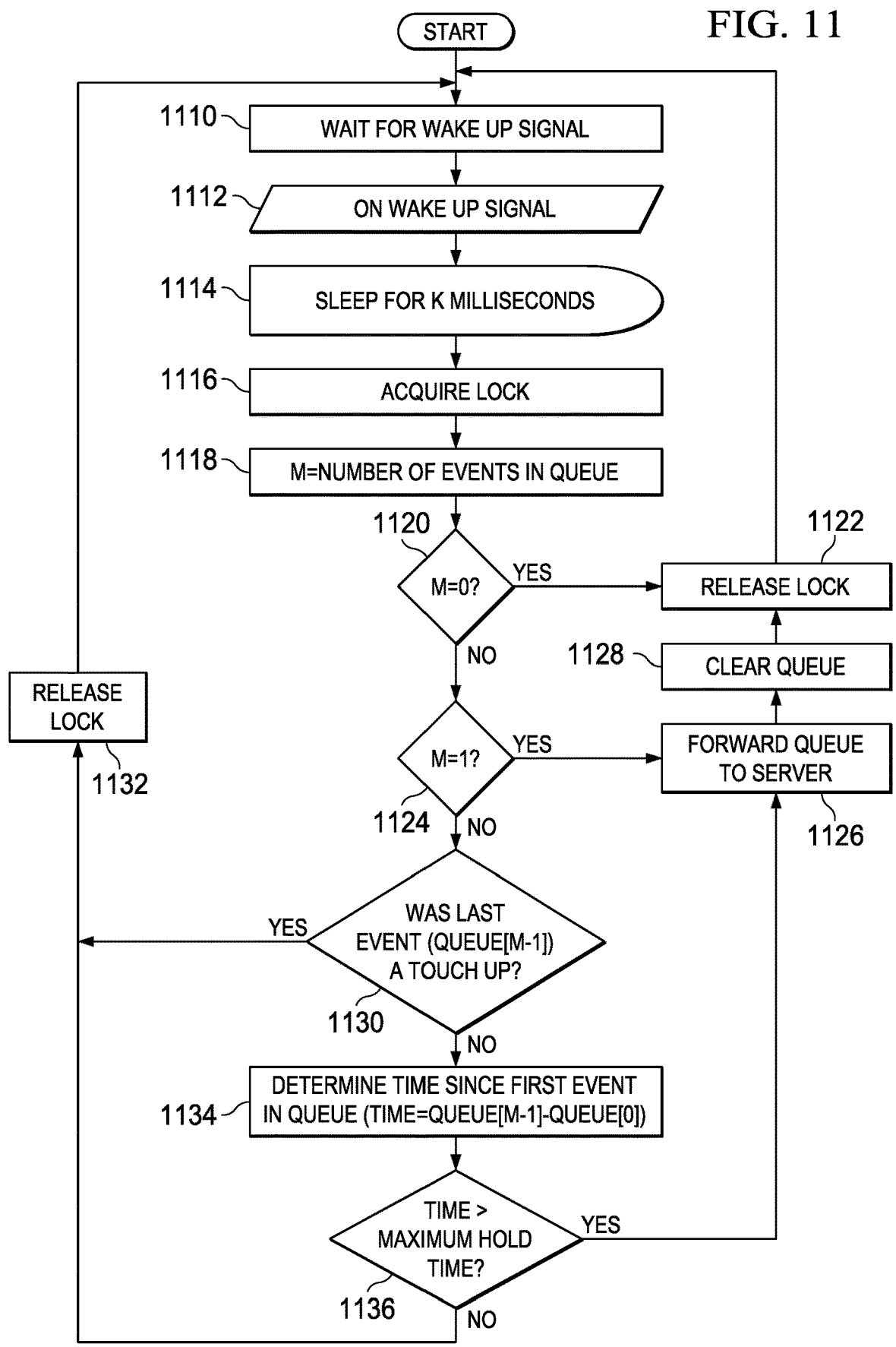
FIG. 11 depicts a flowchart of a secondary thread for handling touch events at a client device according to one embodiment.

FIG. 10 depicts a flowchart of a process for handling touch events at a client device, including invoking a secondary thread under certain circumstances, according to one embodiment. FIG. 11 depicts a flowchart of the secondary thread invoked by the process depicted in FIG. 10. Generally, one goal of the processes shown in FIGS. 10 and 11 is to dispatch events accumulated in the queue when the process would otherwise pause, while waiting for the user to move a finger, for example. Note that, with two threads operating at the same time, it desired that the threads stay synced and operate correctly under all circumstances. One embodiment for accomplishing this is to create a lock object. When one thread acquires the lock, the other thread is prevented from also acquiring the lock, until it is released. This forces the two threads to stay synced and work for all circumstances.

The process depicted in FIG. 10 begins at block 1008 where a lock object is created. The secondary thread (FIG. 11) is also created and started. At step 1010, a touch event is captured by the touch screen of the client device. Once a touch event is captured, the first thread acquires lock (step 1012). This prevents the second thread from moving past the acquired lock block and prematurely forwarding the queue to the server. At step 1014, the process determines whether two or more touch pointers were captured in the touch event. If so, the process proceed to step 1016 where the touch event is added to the queue. The touch event data accumulated in the queue is then forwarded to the server, the queue is cleared, and the lock is released. The process then waits for the next touch event (step 1010). If only one touch pointer is captured (as determined at step 1014), the process determines if the touch event was a touch down event (step 1018). If so, the touch event is added to the queue (step 1020), the lock is released, and a wake up signal is sent to the secondary thread. The secondary thread will ensure that touch events are not unduly held up (described below). The process then waits for the next touch event (step 1010).

If the touch event was not a touch down, the process determines if the touch event was a touch up event (step 1022). If so, the process proceed to step 1016 where the touch event is added to the queue. The touch event data accumulated in the queue is then forwarded to the server, the queue is cleared, and the lock is released. The process then waits for the next touch event (step 1010).

If the touch event was not a touch up, the process assumes that the event is a touch move, and analyzes the speed of the touch move (step 1024), relative to the previous touch event. Once the speed is determined (for example, using the technique described above with respect to FIG. 8), the process determines whether the calculated speed is less than a threshold speed (step 1026). If the speed is less than the threshold, the process proceeds to step 1016, where the touch event is added to the queue. The touch event data accumulated in the queue is then forwarded to the server, the queue is cleared, and the lock is released. The process then waits for the next touch event (step 1010). If the speed is greater than the threshold, the touch event is added to the queue (step 1020), the lock is released, and a wake up signal is sent to the secondary thread. The process then waits for the next touch event (step 1010).

As described above with respect to FIG. 10, when a touch event is added to the queue at step 1020, the secondary thread (FIG. 11) receives a wake up signal. As shown in FIG. 11, at step 1110, the process waits for the wake up signal. When a wake up signal is received (step 1112), the thread sleeps for K milliseconds (step 1114), where K is a constant selected as an acceptable delay between subsequent touch events, as one skilled in the art would understand. After K milliseconds have passed, the secondary thread acquires lock (step 1116). If, for some reason, the primary thread (FIG. 10) has already acquired lock, the secondary thread will halt until the primary thread releases lock. At step 1118, the process determines the number of events in the queue. If the number of events in the queue (step 1120) is zero (i.e., there are no events in the queue), the secondary thread releases lock (step 1122) and waits for another wake up signal. If the number of events in the queue (step 1124) is one, the queue is forwarded to the server (step 1126), the queue is cleared (step 1128), lock is released (step 1122), and the secondary thread waits for another wake up signal (step 1110).

If the number of events in the queue is greater than 1, the process determines whether the last event was a touch up event (step 1130). If the last event was a touch up event, the secondary thread releases lock (step 1132) and waits for the next wake up signal (step 1110). Note that the process releases lock on a touch up event since the primary thread will cause the queue to be forwarded to the server (step 1016). If the last event was not a touch up event, the process determines the time elapsed since the first event in the queue (step 1134). In other words, the process determines how long touch events have been captured and stored in the queue, but not forwarded to the server. At step 1136, the process determines if the time elapsed is greater than a maximum hold time. The maximum hold time has a value chosen as the maximum acceptable time for touch data to be held in the queue, as one skilled in the art would understand. If the maximum hold time has been exceeded, the queue is forwarded to the server (step 1126), the queue is cleared (step 1128), lock is released (step 1122), and the secondary thread waits for another wake up signal (step 1110). If the maximum hold time has not been exceeded, the secondary thread releases lock (step 1132) and waits for the next wake up signal (step 1110).

In the embodiments depicted in FIGS. 10 and 11, the process at the server can be the same as that illustrated in FIG. 9, described above.

Figure 12:
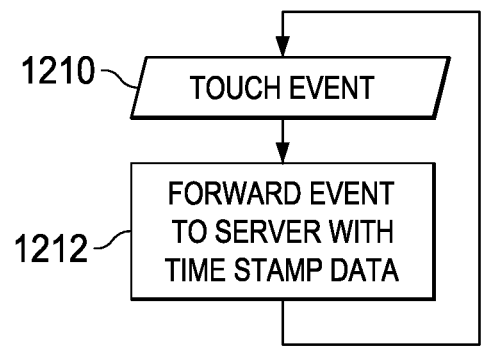
FIG. 12 depicts a flowchart of a process for handling touch events at a client device, where touch events are analyzed at the server, according to one embodiment.
Figure 13:
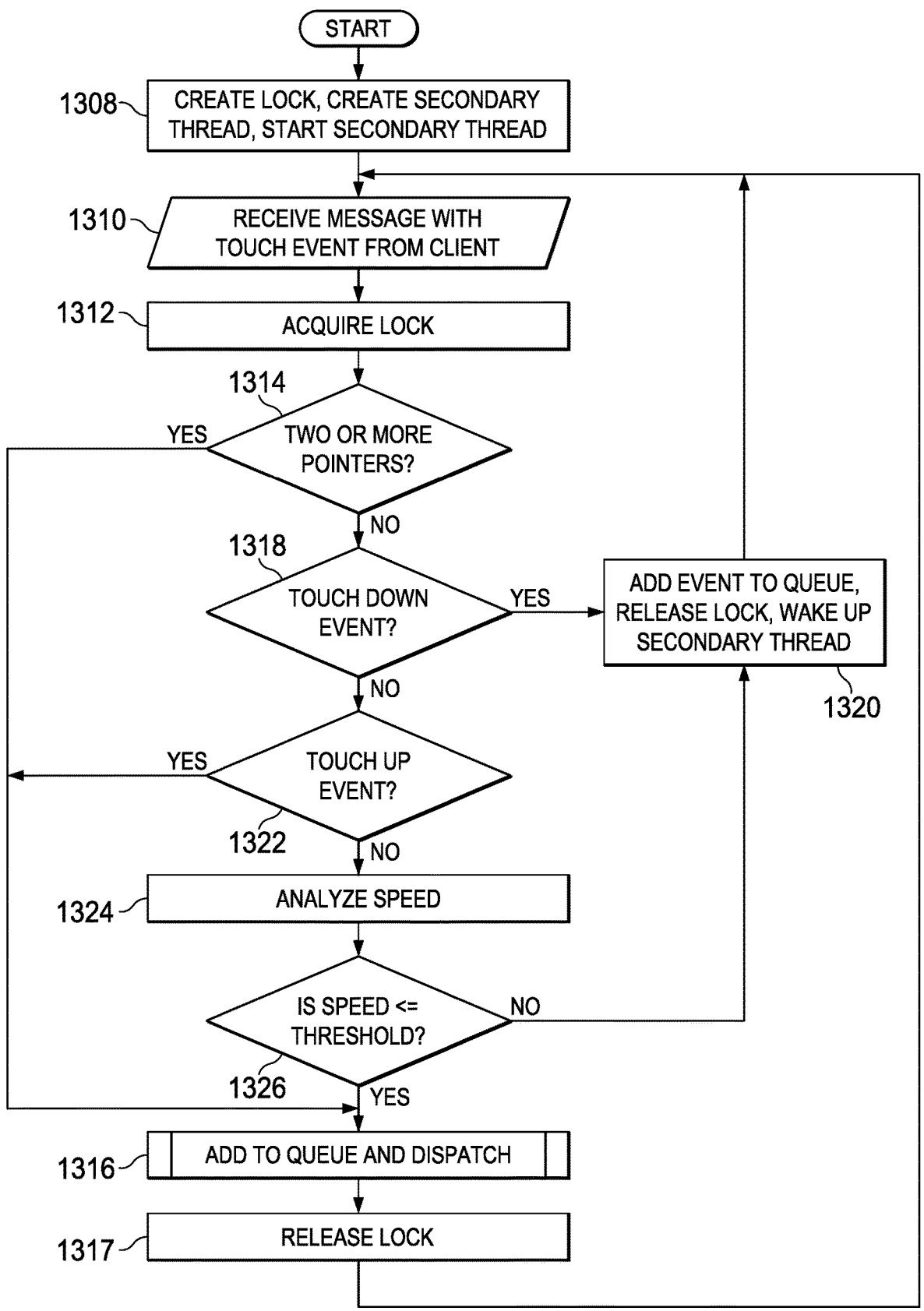
FIG. 13 depicts a flowchart of a process for handling touch events at a server, including invoking a secondary thread, according to one embodiment.

In the preceding examples, the speed analysis of the touch events is performed at the client device. In other examples, the speed analysis of the touch events is performed at the server. Whether the speed analysis is performed at the client device or the server, the goals are the same. However, each approach has advantages and disadvantages. Performing the speed analysis at the server shortens latency between the touch gestures and the response from the server, at the expense of twice the amount of messages sent through the network. FIGS. 12 and 13 are flowcharts depicting embodiments where the speed analysis is performed at the server.

FIG. 12 depicts a flowchart of a process for handling touch events at a client device, where touch events are analyzed at the server, according to one embodiment. At step 1210, a touch event is captured by the touch screen of the client device. At step 1212, the touch event is forwarded to the server, along with time stamp data. The time stamp data ensures that the server will be able to reconstruct the captured touch events, including their relative timing and speed.

Figure 14:
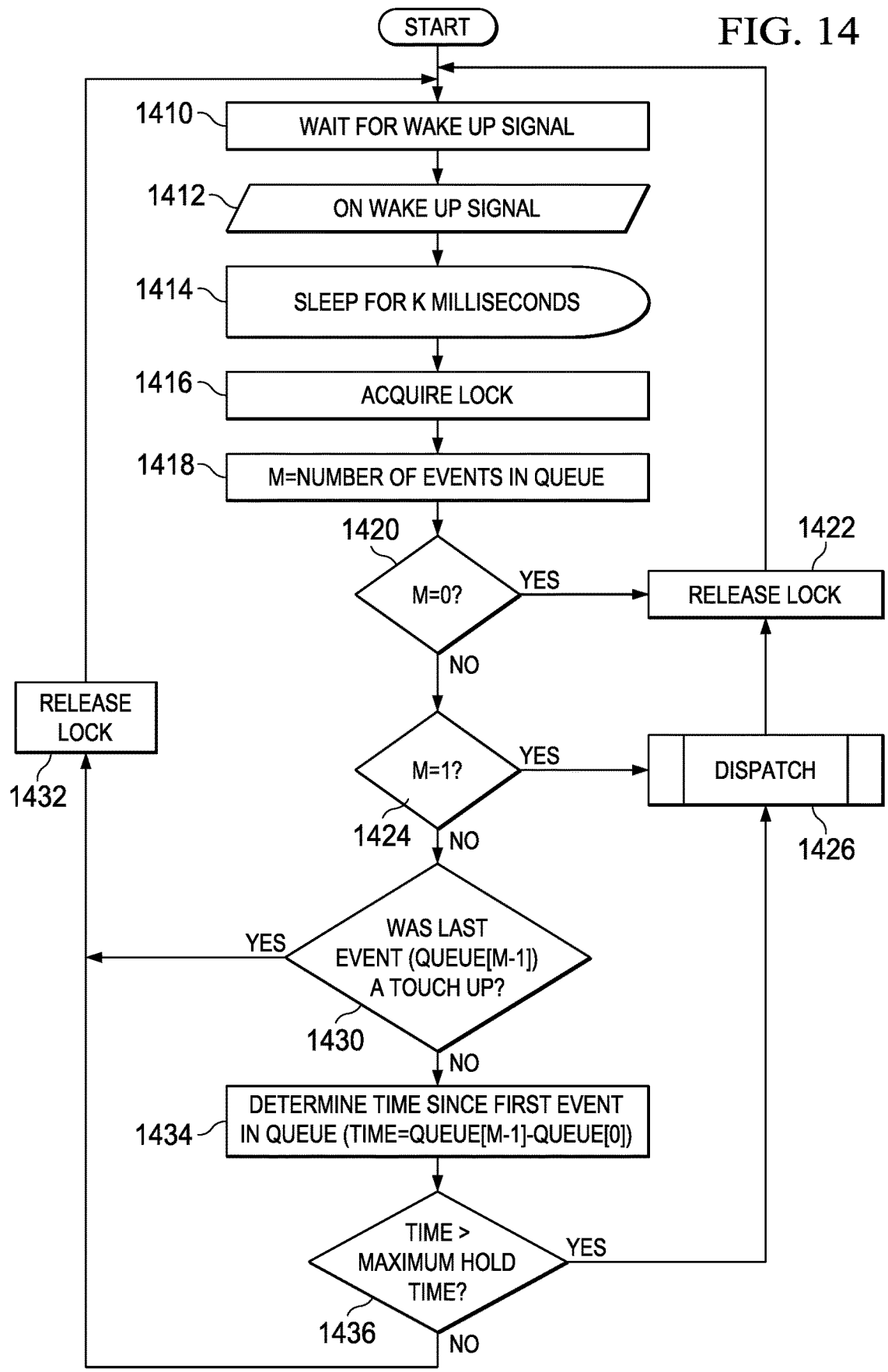
FIG. 14 depicts a flowchart of a secondary thread for handling touch events at a server according to one embodiment.

FIG. 13 depicts a flowchart of a process for handling touch events at a server device, including invoking a secondary thread under certain circumstances (similar to the process of FIG. 10), according to one embodiment. FIG. 14 depicts a flowchart of the secondary thread invoked by the process depicted in FIG. 13.

The process depicted in FIG. 13 begins at block 138 where a lock object is created. The secondary thread (FIG. 14) is also created and started. At step 1310, a message containing a touch event is received from the client device. Once a touch event message is received, the first thread acquires lock (step 1312). This prevents the second thread from moving past the acquired lock block and prematurely dispatching the queue. At step 1314, the process determines whether two or more touch pointers were received. If so, the process proceed to step 1316 where the touch event is added to the queue and the queue is dispatched to the software stack via a dispatch subroutine (described below). Next, the thread releases lock (step 1317) and the process then waits for the next touch event message (step 1310). If only one touch pointer is captured, the process determines if the touch event was a touch down event (step 1318). If so, the touch event is added to the queue (step 1320), the lock is released, and a wake up signal is sent to the secondary thread. The process then waits for the next touch event message (step 1310).

If the touch event was not a touch down, the process determines if the touch event was a touch up event (step 1322). If so, the process proceed to step 1316 where the touch event is added to the queue and the queue is dispatched to the software stack via the dispatch subroutine. Next, the thread releases lock (step 1317). The process then waits for the next touch event message (step 1310).

If the touch event was not a touch up, the process assumes that the event is a touch move, and analyzes the speed of the touch move (step 1324), relative to the previous touch event. Once the speed is determined, the process determines whether the calculated speed is less than a threshold speed (step 1326). If the speed is less than the threshold, the process proceed to step 1316, where the touch event is added to the queue and the queue is dispatched to the software stack via the dispatch subroutine. Next, the thread releases lock (step 1317) and the process waits for the next touch event message (step 1310). If the speed is greater than the threshold, the touch event is added to the queue (step 1320), the lock is released, and a wake up signal is sent to the secondary thread. The process then waits for the next touch event (step 1310).

As described above with respect to FIG. 13, when a touch event is added to the queue at step 1320, the secondary thread (FIG. 14) will receive a wake up signal. As shown in FIG. 14, at step 1410, the process waits for the wake up signal. When a wake up signal is received (step 1412), the secondary thread sleeps for K milliseconds (step 1414), where K is a constant selected as an acceptable delay between subsequent touch events, as one skilled in the art would understand. After K milliseconds have passed, the secondary thread acquires lock (step 1416). At step 1418, the process determines the number of events M in the queue. If the number of events M in the queue (step 1420) is zero (i.e., there are no events in the queue), the secondary thread releases lock (step 1422) and waits for another wake up signal (step 1410). If the number of events in the queue (step 1424) is one, the dispatch subroutine (described below) is started to dispatch the queue to the software stack (step 1426). Next, lock is released (step 1422) and the secondary thread waits for another wake up signal (step 1410).

If the number of events in the queue is greater than 1, the process determines whether the last event was a touch up event (step 1430). If the last event was a touch up event, the secondary thread releases lock (step 1432) and waits for the next wake up signal (step 1410). Note that the process releases lock on a touch up event since the primary thread will cause the queue to be forwarded to the server (step 1316). If the last event was not a touch up event, the process determines the time elapsed since the first event in the queue (step 1434). In other words, the process determines how long touch events have been captured and stored in the queue, but not yet forwarded to the server. At step 1436, the process determines if the time calculated in step 1434 is greater than a maximum hold time. The maximum hold time has a value chosen as the maximum acceptable time for touch data to be held in the queue, as one skilled in the art would understand. If the maximum hold time has been exceeded, the dispatch subroutine is started to dispatch the queue to the software stack (step 1426). Next, lock is released (step 1422) and the secondary thread waits for another wake up signal (step 1410). If the maximum hold time has not been exceeded, the secondary thread releases lock (step 1432) and waits for the next wake up signal (step 1410).

Figure 15:
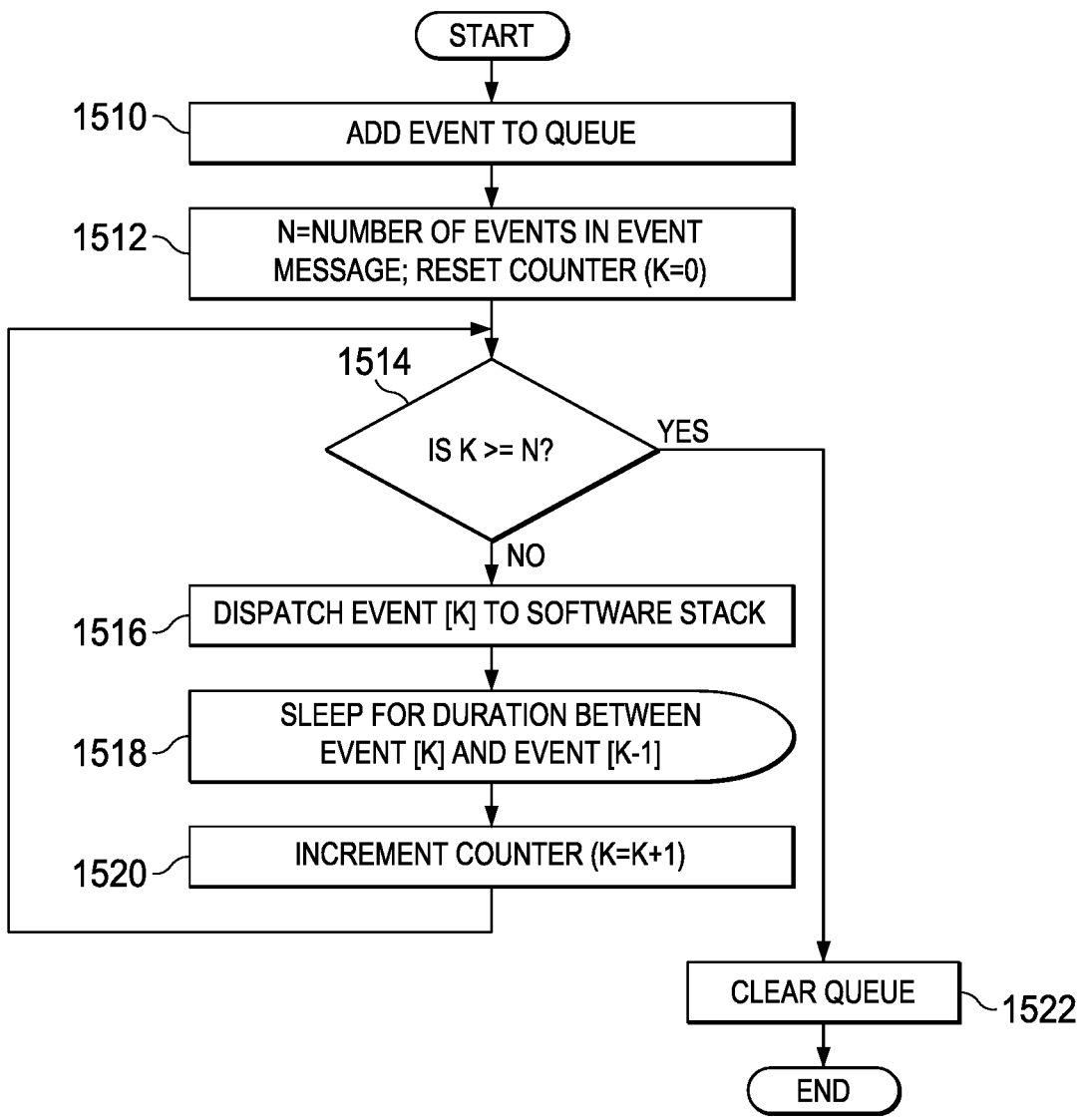
FIG. 15 depicts a flowchart of the dispatch subroutine shown in FIG. 13, according to one embodiment.

FIG. 15 depicts a flowchart of the "add to queue & dispatch" subroutine shown in step 1316 of FIG. 13, according to one embodiment. First, at step 1510, a touch event message is added to the queue. The touch event message (referred to in FIG. 13) includes information relating to all of the events in the queue that were received by the server.

The information includes the type of each touch event, as well as timing information. At step 1512, variable N is set to equal the number of touch events in the received touch event message. A loop counter K is set to zero.

At step 1514, the process determines if the loop counter K is greater than or equal to the number of touch events (N) in the received touch event message. If not, event[K] is dispatched to the software stack. For example, on the first pass of the loop (K=1), information about the first touch event in the queue is sent to the software stack. At step 1518, the process sleeps for a time equal to the duration between the touch event[K] and the next touch event[K+1]. At step 1520, the loop counter K is incremented by one, and the process proceeds again to step 1514 to process the next touch event. As the process proceeds through the loop formed by steps 1514, 1516, 1518, and 1520, the data points of the captured touch events at the client are reconstructed. Referring back to FIG. 7, by dispatching subsequent events and sleeping between dispatches (for durations equal to times T1, T2, T3, T4, T5, for example), the loop accurately reconstructs the data points in the event message (like the set 730 of data points in FIG. 7), which will closely match the set 710 of data points collected at the client device. At the end of the loop (when counter K is greater than or equal to the number of events in the touch event message), the process proceeds to step 1522, where the queue is cleared, and the subroutine ends.

Figure 16:
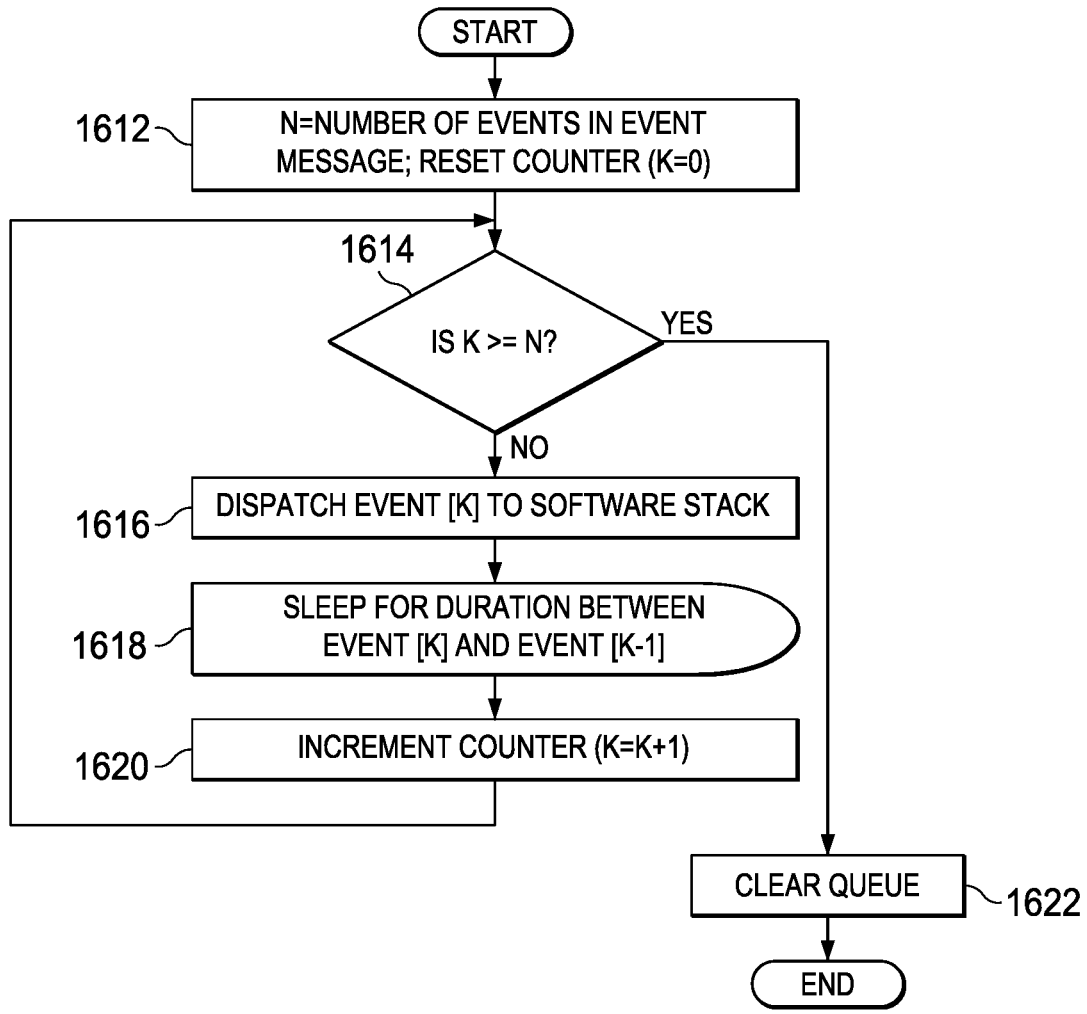
FIG. 16 depicts a flowchart of the dispatch subroutine shown in FIG. 14, according to one embodiment.

FIG. 16 depicts a flowchart of the dispatch subroutine shown in step 1426 of FIG. 14, according to one embodiment. When the dispatch subroutine is called, the secondary thread illustrated in FIG. 14 has already determined that either the queue contains only one event, or that the maximum hold time has been exceeded. First, at step 1612, variable N is set to equal the number of touch events in the touch event message and loop counter K is set to zero.

At step 1614, the process determines if the loop counter K is greater than or equal to the number of touch events (N) in the touch event message. If not, touch event[K] is dispatched to the software stack. For example, on the first pass of the loop (K=1), information about the first touch event in the queue is sent to the software stack. At step 1618, the process sleeps for a time equal to the duration between the touch event[K] and the next touch event[K+1]. At step 1620, the loop counter K is incremented by one, and the process proceeds again to step 1614 to process the next touch event. As the process proceeds through the loop formed by steps 1614, 1616, 1618, and 1620, the data points of the captured touch events at the client are reconstructed. Referring back to FIG. 7, by dispatching subsequent events and sleeping between dispatches (for durations equal to times T1, T2, T3, T4, T5, for example), the loop accurately reconstructs the data points in the event message (like the set 730 of data points in FIG. 7), which will closely match the touch events captured by the client device (for example, the set 710 of data points shown in FIG. 7). At the end of the loop (when counter K is greater than or equal to the number of events M in the touch event message), the process proceeds to step 1622, where the queue is cleared, and the dispatch subroutine ends.

Since time stamped touch event data is received by the server, this data can be used for other uses. In some embodiments, time-stamped touch event data generated by a specific user can be stored and correlated with the specific user. In one example, the time-stamped touch data can be used to analyze the user's actions. In another example, the time-stamped touch data is relied upon by a computer algorithm to compare current touch data to previous touch data captured from the user. This comparison can be used, for example, as a form of biometric data to indicate trust in a user's identity. Similarly, finger pressure for touch data can be recorded and used to analyze a user's actions at the server side. Accordingly, embodiments can relay touch data with time stamps, finger touch areas, pressures etc. from a client application to a server (e.g., in some embodiments, a virtual device running on a remote server) such that a biometric analysis can be done on a remote OS in a thin client deployment.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like. In embodiments of the invention, the computer has access to at least one database over the network.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as standalone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method for capturing touch events, the method comprising:
    capturing touch event data from a touch event at a client device, the touch event data comprising a type of touch event associated with the touch event;
    in response to capturing the touch event data, acquiring a lock that prevents the touch event data from being sent to a server;
    determining, based on a requirement associated with the touch event being satisfied, to send the touch event data to the server without waiting for another touch event at the client device; and
    based on the determining, releasing the lock and sending the touch event data to the server.

2. The method according to claim 1, wherein the touch event data comprises timing information for the touch event, and wherein the touch event is reconstructed at the server based on the timing information.

3. The method according to claim 1, wherein the requirement comprises requiring that a speed of the touch event satisfies a threshold, and
    wherein the determining to send the touch event data comprises:
        determining that the speed of the touch event satisfies the threshold; and
        determining to send the touch event data to the server without waiting for another touch event at the client device based on the determination that the speed of the touch event satisfies the threshold.

4. The method according to claim 1, wherein the requirement comprises requiring that the touch event is a first type of touch event of a plurality of touch event types, and
    wherein the determining to send the touch event data comprises:
        determining that the touch event corresponds to the first type of touch event; and
        determining to send the touch event data to the server without waiting for another touch event at the client device based on the determination that the touch event is the first type of touch event.

5. The method according to claim 1, wherein the requirement comprises requiring a maximum hold time associated with the touch event data to have transpired, and
    wherein the determining to send the touch event data comprises:
        determining that the maximum hold time associated with the touch event has transpired; and
        determining to send the touch event data to the server without waiting for another touch event at the client device based on the determination that the maximum hold time has transpired.

6. The method according to claim 1, wherein the requirement comprises requiring that the touch event is a touch up event, and
    wherein the determining to send the touch event data comprises:
        determining that the touch event is a touch up event; and
        determining to send the touch event data to the server without waiting for another touch event at the client device based on the determination that the touch event is a touch up event.

7. The method according to claim 1, wherein the requirement comprises requiring that a queue associated with the touch events stores no more than one touch event after a predetermined quantity of time has transpired, and wherein the determining to send the touch event data comprises:
    determining that the queue associated with the touch events stores no more than one touch event after the predetermined quantity of time has transpired; and
    determining to send the touch event data to the server without waiting for another touch event at the client device based on the determination that the queue associated with the touch events stores no more than one touch event after the predetermined quantity of time has transpired.

8. The method according to claim 1, wherein the releasing the lock occurs after the sending the touch event data to the server.

9. One or more non-transitory, computer-readable media storing instructions that, when executed by one or more processors, effectuate operations comprising:
    capturing touch event data from a touch event at a client device, the touch event data comprising a type of touch event associated with the touch event;
    in response to capturing the touch event data, acquiring a lock that prevents the touch event data from being sent to a server;

determining, based on a requirement associated with the touch event being satisfied, to send the touch event data to the server without waiting for another touch event at the client device; and based on the determining, releasing the lock and sending the touch event data to the server.

10. The non-transitory, computer-readable media according to claim 9, wherein the requirement comprises requiring that a queue associated with the touch events stores no more than one touch event after a predetermined quantity of time has transpired, and
wherein the determining to send the touch event data comprises:
determining that the queue associated with the touch events stores no more than one touch event after the predetermined quantity of time has transpired; and
determining to send the touch event data to the server without waiting for another touch event at the client device based on the determination that the queue associated with the touch events stores no more than one touch event after the predetermined quantity of time has transpired.

11. The non-transitory, computer-readable media according to claim 9, wherein the requirement comprises requiring that a speed of the touch event satisfies a threshold, and
wherein the determining to send the touch event data comprises:
determining that the speed of the touch event satisfies the threshold; and
determining to send the touch event data to the server without waiting for another touch event at the client device based on the determination that the speed of the touch event satisfies the threshold.

12. The non-transitory, computer-readable media according to claim 9, wherein the requirement comprises requiring that the touch event is a first type of touch event of a plurality of touch event types, and
wherein the determining to send the touch event data comprises:
determining that the touch event corresponds to the first type of touch event; and
determining to send the touch event data to the server without waiting for another touch event at the client device based on the determination that the touch event is the first type of touch event.

13. The non-transitory, computer-readable media according to claim 9, wherein the requirement comprises requiring a maximum hold time associated with the touch event data to have transpired, and
wherein the determining to send the touch event data comprises:
determining that the maximum hold time associated with the touch event has transpired; and
determining to send the touch event data to the server without waiting for another touch event at the client device based on the determination that the maximum hold time has transpired.

14. The non-transitory, computer-readable media according to claim 9, wherein the releasing the lock occurs after the sending the touch event data to the server.

15. A system for capturing touch events, the system comprising:
one or more processors programed with computer program instructions that, when executed, cause the system to:
capture touch event data from a touch event at a client device, the touch event data comprising a type of touch event associated with the touch event;
in response to capturing the touch event data, acquire a lock that prevents the touch event data from being sent to a server;
determine, based on a requirement associated with the touch event being satisfied, to send the touch event data to the server without waiting for another touch event at the client device; and
based on the determining, release the lock and send the touch event data to the server.

16. The system according to claim 15, wherein the requirement comprises requiring that a queue associated with the touch events stores no more than one touch event after a predetermined quantity of time has transpired, and
wherein the determining to send the touch event data comprises:
determining that the queue associated with the touch events stores no more than one touch event after the predetermined quantity of time has transpired; and
determining to send the touch event data to the server without waiting for another touch event at the client device based on the determination that the queue associated with the touch events stores no more than one touch event after the predetermined quantity of time has transpired.

17. The system according to claim 15, wherein the requirement comprises requiring that a speed of the touch event satisfies a threshold, and
wherein the determining to send the touch event data comprises:
determining that the speed of the touch event satisfies the threshold; and
determining to send the touch event data to the server without waiting for another touch event at the client device based on the determination that the speed of the touch event satisfies the threshold.

18. The system according to claim 15, wherein the requirement comprises requiring that the touch event is a first type of touch event of a plurality of touch event types, and
wherein the determining to send the touch event data comprises:
determining that the touch event corresponds to the first type of touch event; and
determining to send the touch event data to the server without waiting for another touch event at the client device based on the determination that the touch event is the first type of touch event.

19. The system according to claim 15, wherein the requirement comprises requiring a maximum hold time associated with the touch event data to have transpired, and
wherein the determining to send the touch event data comprises:
determining that the maximum hold time associated with the touch event has transpired; and
determining to send the touch event data to the server without waiting for another touch event at the client device based on the determination that the maximum hold time has transpired.

20. The system according to claim 15, wherein the releasing the lock occurs after the sending the touch event data to the server.

* * * * *